(12) United States Patent
Coates

(10) Patent No.: US 11,307,148 B2
(45) Date of Patent: Apr. 19, 2022

(54) SENSOR SYSTEM FOR MULTI-COMPONENT FLUIDS

(71) Applicant: SAAM, Inc., Indianapolis, IN (US)

(72) Inventor: John Coates, Newtown, CT (US)

(73) Assignee: SAAM, Inc., Indianapolis, IN (US)

( * ) Notice: Subject to any disclaimer, the term of this patent is extended or adjusted under 35 U.S.C. 154(b) by 0 days.

(21) Appl. No.: 16/731,618

(22) Filed: Dec. 31, 2019

(65) Prior Publication Data

US 2020/0348225 A1 Nov. 5, 2020

Related U.S. Application Data

(62) Division of application No. 15/409,461, filed on Jan. 18, 2017, now abandoned.

(Continued)

(51) Int. Cl.
| | |
|---|---|
| *G01N 21/85* | (2006.01) |
| *G01J 3/00* | (2006.01) |
| *G01J 3/02* | (2006.01) |
| *G01J 3/36* | (2006.01) |
| *G01J 3/42* | (2006.01) |
| *G01N 21/25* | (2006.01) |

(Continued)

(52) U.S. Cl.
CPC ............ *G01N 21/8507* (2013.01); *G01J 3/00* (2013.01); *G01J 3/0202* (2013.01); *G01J 3/0205* (2013.01); *G01J 3/0256* (2013.01); *G01J 3/0291* (2013.01); *G01J 3/36* (2013.01); *G01J 3/42* (2013.01); *G01J 3/457* (2013.01); *G01N 21/255* (2013.01); *G01N 21/359* (2013.01); *G01N 21/85* (2013.01); *G01N 2201/08* (2013.01)

(58) Field of Classification Search
CPC .......... G01J 3/00; G01J 3/0202; G01J 3/0205; G01J 3/0256; G01J 3/0291; G01J 3/36; G01J 3/42; G01J 3/457; G01N 21/255; G01N 21/359; G01N 2201/08; G01N 21/85; G01N 21/8507
See application file for complete search history.

(56) References Cited

U.S. PATENT DOCUMENTS

| | | | | |
|---|---|---|---|---|
| 7,459,713 | B2 * | 12/2008 | Coates | ...................... G01J 3/02 250/239 |
| 7,907,282 | B2 * | 3/2011 | Coates | ............... G01N 21/4738 356/419 |

(Continued)

*Primary Examiner* — Violeta A Prieto
(74) *Attorney, Agent, or Firm* — Ulmer & Berne LLP

(57) ABSTRACT

A small scale and low cost spectral sensing system designed primarily for multi-component fluids that provides a compact, low cost platform for analyzers or chemical sensors with limited number of optical and mechanical components featuring a light source, an optical interface with the sample, and a custom detector (multi-element). A single detector element has a specific wavelength, defined by a filter that can be used to select and measure specific chemical compounds. Multiple detector elements are combined to create a multi-channel detector capable of measuring a broad range of wavelengths from ultraviolet (UV) to near and mid-infrared wavelengths. The fabricated sensor can be configured for almost any class of material including gases, vapors, and liquids, with extension to solids. This is linked to the use of the custom detectors featuring filters tailored to specific substances in a broad spectral range from the UV to infrared.

21 Claims, 29 Drawing Sheets

Related U.S. Application Data

(60) Provisional application No. 62/279,859, filed on Jan. 18, 2016.

(51) Int. Cl.
 *G01J 3/457* (2006.01)
 *G01N 21/359* (2014.01)

(56) References Cited

U.S. PATENT DOCUMENTS

| | | | | |
|---|---|---|---|---|
| 9,322,773 | B2* | 4/2016 | Coates | G01F 23/292 |
| 11,209,351 | B2* | 12/2021 | Coates | G01N 21/31 |
| 11,237,140 | B2* | 2/2022 | Coates | G01N 21/3504 |
| 2005/0088653 | A1* | 4/2005 | Coates | G01N 21/85 |
| | | | | 356/419 |
| 2007/0084990 | A1* | 4/2007 | Coates | G01J 3/0272 |
| | | | | 250/226 |
| 2008/0265146 | A1* | 10/2008 | Coates | G01J 3/513 |
| | | | | 250/226 |
| 2013/0045541 | A1* | 2/2013 | Fix | G01N 33/0013 |
| | | | | 436/164 |
| 2014/0226149 | A1* | 8/2014 | Coates | G01N 33/28 |
| | | | | 356/51 |
| 2017/0146449 | A1* | 5/2017 | Coates | G01N 21/3504 |
| 2017/0205338 | A1* | 7/2017 | Coates | G01J 3/0291 |

* cited by examiner

SENSOR SYSTEM FOR MULTI-COMPONENT FLUIDS

CROSS-REFERENCE TO RELATED APPLICATION

This U.S. Patent Application is a divisional of Ser. No. 15/409,461, filed on Jan. 18, 2017, which claims priority to U.S. Provisional 62/279,859 filed Jan. 18, 2016, the disclosure of which is considered part of the disclosure of this application and is hereby incorporated by reference in its entirety.

FIELD OF THE INVENTION

This invention relates generally to optical sensors, spectroscopy, and associated systems. More particularly, it relates to optical sensors and systems that may be used, for example, for the analysis and characterization of fluids.

BACKGROUND

Traditional "wet chemistry" test methods, such as gravimetric or titrimetric methods, such as acid/base and KF moisture titrations are commonly used in laboratories as standard reference methods for determining the component concentrations of a liquid sample. These methods are labor intensive and have a significant cost burden because they require the need for reagents, solvent and eventual waste disposal. While these methods are common, and in many cases required for regulatory or reference measurement reasons, they are considered undesirable and there is a general movement away from them.

Optical spectral measurements for the monitoring of static and dynamic fluid systems is well established in the field of spectroscopy. Traditional systems may include the use of a spectrometric measurement system, such as a spectrometer or photometer, optically interfaced to a fluid stream, such as a liquid or gas. In the case of spectrometer systems, commercial dispersive near-infrared (NIR) or Fourier transform infrared (FTIR, near- and mid-IR) instruments are usually used in transmission, specular reflectance, transflectance (a combination of transmittance and reflectance) and internal reflectance modes of operation. These are very different approaches insofar as the spectroscopy method relies on measuring the spectra of the key components and then relying on spectral resolution or mathematics to separate and measure the individual contributions from the components.

Other traditional methods of analysis of multi-component gas and vapor monitoring include gas chromatography (GC). Gas chromatography physically separates the components by the chromatograph and the separated components are measured directly from the chromatogram by a suitable detection system; such as a flame ionization detection (FID) system. This method can be very expensive and may generate a significant service or operating overhead when implemented in a continuous monitoring system, particularly because GC requires the use of high purity compressed gases). Similarly, mass spectrometry is another method for multi-component gas and/or vapor analysis that works by measuring the mass-to-charge ratio and abundance of gas-phase ions within a high vacuum. This method is also costly and hard to reduce to a scalable sensor that can be used for commercial sensing applications.

U.S. Pat. No. 7,339,657 and published patent application US 2014/0226149 A1 by Coates et al., hereby incorporated by reference in their entirety, discuss each of these modes of operation as implemented into various optical sensor packages. These examples feature near infrared light-emitting diodes (LEDs) that are used for oil condition (soot level) and urea solution quality measurements. The soot measurement is a simple photometric measurement with one primary wavelength (940 nm), while the urea quality sensor is a true spectral measurement with a three- or four-point determination having two or three analytical wavelengths, with about 970 nm and about 1050 nm, being the most critical for water and urea, and one wavelength as a reference or baseline, about 810 nm. In both cases attenuation of signal intensity is used to compute the infrared (near-infrared) absorption, which is correlated to the concentrations of soot (in oil) and the relative concentrations of water and urea in the binary mixture or solution.

However, these sensors are still limited in spectral range by the wavelength specific LEDs. Additionally, these embodiments require longer path lengths to efficiently and accurately measure the samples, which requires the sensor package to be large and can require a larger sample. These larger packages make it harder to implement in certain applications, and may suffer from added environmental interference with the sample. For example, a fluid sample may freeze under certain conditions due to the larger quantity of fluid needed to measure the sample.

More generally, optical spectroscopy, such as infrared spectroscopy is a recognized technique for the analysis and characterization of various types of fluids used in industrial, environmental, automotive and transportation applications, including solvents, fuels, lubricants, functional fluids, coolants and diesel emission fluids such as aqueous urea solutions. Such spectroscopic measurements can provide meaningful data about the condition of the fluid and the fluid-mechanical system during service. The term "infrared spectroscopy" is used in the broadest sense, and includes both near infrared and mid-infrared, and covers the region from about 700 nm to about 26,000 nm.

Infrared spectroscopy, as used and understood herein, can provide measurement of fluid quality and other particular properties. For example, fluids such as fuel or coolant may be measured for properties such as oxidation, coolant contamination, fuel dilution, and soot content. In most cases, this information is derived directly as a measure of the chemical functionality, as defined by the characteristic vibrational group frequencies observed in the various forms of infrared spectra. Further, the UV and visible spectra may provide information derived from color and/or information derived from electronic transitions or coupled vibrations, and can be applied to provide information about oxidation, moisture and additive content, by way of example.

While the infrared spectral region is definitive in terms of the measurement of materials as chemical entities, the measurements can be difficult to implement in terms of the materials used. More specifically, the optics and associated materials used in these measuring devices are relatively expensive and do not always lend themselves to easy replication for production scale analysis.

Moreover, when multiple devices are implemented into a larger monitoring system used in, for example, industrial process or automotive monitoring applications, these systems often become prohibitively large, complex, and expensive. Another factor to consider is the operating environment. If a monitoring system is to be used in a relatively benign environment, such as in a laboratory under standard ambient conditions or in a climate conditioned indoor facility, then the known construction may be appropriate. However, if there is a requirement to measure a fluid system in a harsher environment, such as on a process line (indoors or outdoors), on a vehicle, or a mobile or fixed piece of equipment, then it is necessary to utilize a more robust system capable of operating under such conditions. This may include considering the temperature sensitivity of the components, as well as their resilience to long-term exposure to continuous vibrations.

Additional factors for consideration include size, thermal stability, vibration immunity, spectral range, and cost. Alternative fluid measurement systems and techniques for fluid, gas, and vapor sensing and monitoring that address one or more of these considerations are desired. There exists a need for a more compact sensor that can operate within a broader spectral range for vapors, gases, liquid, and other materials, including solids or mixed phase forms (e.g., emulsions, pastes, and foams).

The present invention can be used in a wide variety of industries where liquid, gas and vapor sensing and monitoring is critical, especially related to the analysis, in applications requiring environmental, safety, and process considerations.

BRIEF SUMMARY OF THE INVENTION

In one aspect, this disclosure is related to a system for determining in a sample the composition or concentration of a component or components of said sample, comprising an integrated light source; a detector system, wherein said detector system comprises at least one detector element having an optical filter configured to detect a pre-determined wavelength intensity of radiation transmitted through the sample by said light source; a coupling apparatus; and integrated electronics, wherein the integrated electronics comprise a processor in communication with the at least one sensor, the processor configured to calculate, based on the detected pre-determined wavelength a value of the concentration of the component in the sample.

In another aspect this disclosure is related to a system for determining in a sample the characteristics of components of said sample, comprising an integrated light source; a detector system, wherein said detector system comprising at least one detector element having an optical filter configured to detect a pre-determined wavelength intensity of radiation transmitted through the sample by said light source; a chamber wherein said light source is positioned across from said detector system and said sample passes through said chamber between said light source and said detector system; a coupling apparatus configured to couple said light source and said detector system to the chamber; and integrated electronic, wherein said integrated electronics comprises a processor in communication with the at least one sensor, the processor configured to calculate, based on the detected pre-determined wavelength a value of the concentration of the component in the sample.

In yet another aspect this disclosure relates to a method for determining the component characteristics of a sample, comprising emitting at least one wavelength radiation by a broadband emitting source. Detecting at least one intensity of radiation transmitted through the sample by the source of at least one reference wavelength. Determining the characteristics of the components of a sample based at least in part on the at least one detected intensity.

In another aspect this disclosure relates to a remote sampling sensor for determining the characteristics of a sample, comprising a sample interface, wherein said sample interface if remotely located from said light emitter and detector system and said sample interface has a retro-reflective optic; a light emitter configured to emit a broadband wavelength of light; a light guide configured to transmit emitted light to and from the sample interface; a detector system, wherein said detector system comprises at least one detector element having an optical filter configured to detect a pre-determined wavelength intensity of radiation transmitted through the sample by said light emitter; and integrated electronics, wherein said integrated electronics comprise a processor in communication with the at least one sensor, the processor configured to calculate, based on the detected pre-determined wavelength a value of the concentration of the component in the sample.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1A:
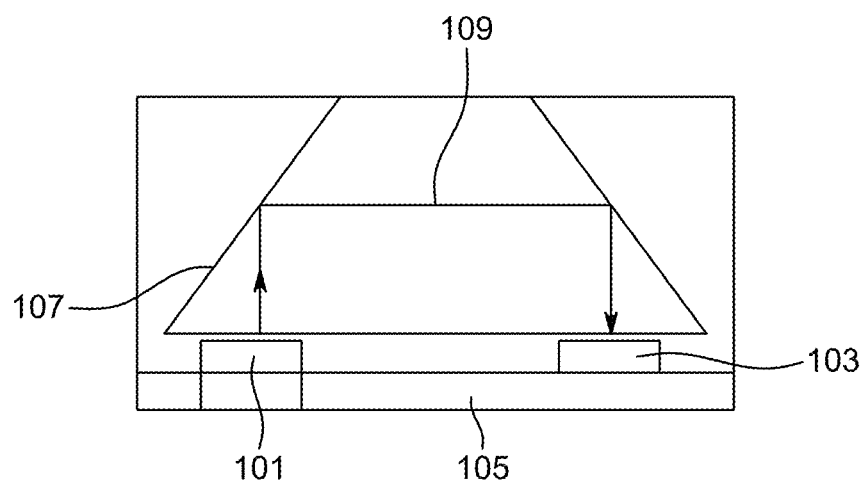
FIG. 1A is an illustration of an exemplary embodiment of compact refractive optical elements that can be used for the sensor of the present invention.

It is to be understood that the figures and descriptions of the present invention have been simplified to illustrate elements that are relevant for a clear understanding of the present invention, while eliminating, for purposes of clarity, many other elements found in fluid measuring systems, including those utilizing spectroscopy. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

The term "processor" when used herein generally refers to a circuit arrangement that may be contained on one or more silicon chips, and/or integrated circuit (IC) boards, and that contains at least one Central Processing Unit (CPU), and may contain multiple CPU's. The CPU may generally include an arithmetic logic unit (ALU), which performs arithmetic and logical operations, and a control unit, which extracts instructions from memory and decodes and executes them, calling on the ALU when necessary.

Processors may take the form of a microprocessor, and may be a low power CMOS processor with an embedded analog to digital converter, by way of non-limiting example only. The present invention is operable with computer storage products or computer readable media that contain program code for performing the various computer-implemented operations. The non-transitory computer-readable medium is any data storage device that can store data which can thereafter be read or accessed by a computer system component such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; solid-state storage devices and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter.

The term "electronics package" as used herein is to be understood broadly and includes any configuration of electronic components for use in providing power to components, such as light sources and detectors, control signals to such components, receiving data from such components, performing calculations and signal processing on data received from such components, storing received and processed data, and providing outputs of such data to monitoring and display systems. Such packages may include discrete analog and digital components, batteries, integrated circuits configured to include multiple analog and/or digital logic components, general purpose and special purpose processors, data storage devices of all descriptions including magnetic, capacitive, random access, read-only and other non-transitory storage media, wireless and wired transmitters, receivers, and transceivers, and other devices, in discrete and integrated form.

The detectors and emitters of all embodiments disclosed herein may be integrated into and integrally formed with electronic packages, such as on printed circuit boards such as control boards of such packages. Alternatively, the detectors and emitters may be configured to be mounted separately from control boards and other electronic devices.

Fluid measuring/monitoring systems according to embodiments of the present disclosure take into account factors of size, thermal stability, vibration immunity and cost, and are configured to facilitate mass production. Sensors and monitoring systems according to embodiments of the present disclosure may simplify the complex arrangements of the prior art by providing a broadband wavelength light or energy source (or sources), a device for interfacing with the sample, and one or more detectors. These simplified spectrometric/photometric systems can be made relatively small and compact compared to the large and expensive monitoring systems of the prior art, while retaining their functionality and reliability in harsh environments.

These systems may include the use of tungsten incandescent light bulbs, gas discharge lamps, or solid-state light emitters (e.g. LEDs or MEMs devices), low-cost, solid state detectors, integrated with opto-electronics that reduce temperature dependency effects, low-cost optics that may be mass-produced such as by molding techniques (if required), and low-cost packaging. Residual temperature effects may be handled by thermal modeling and the application of compensation algorithms.

The sensor devices described in this disclosure may be implemented as monitoring devices for water-based fluids, such as aqueous urea solutions and coolants, in addition to fuels, lubricants and other functional fluids used in automotive vehicles, heavy equipment, and various forms of transportation that involve dynamic fluid lubricant and power conversion systems. They may include sensor devices for monitoring industrial processes and maintenance, monitoring engine oils, transmission oils, hydraulic oils and fluids, turbine oils, coolants and any fluid system that protects mechanical moving parts or transmits power to moving parts. Throughout the disclosure, the term fluid is considered in the broadest sense, and can include gases and vapors, which include off-gassing vapors from fuels, slip and bypass gases from combustion zones, and exhaust gases. In one or more configurations, the sensor can be operated immersed in the fluid, and measurements can be made in a static environment such as a tank or storage vessel, or in a moving environment, such as a fuel line or exhaust pipe. It is understood that the period of measurement may vary from less than a second, to a few seconds, to periods of days or longer, such as for systems where the change in fluid composition (chemistry) changes slowly, if at all. When used for fluid quality assessment the sensor is intended to monitor for changes in composition, including contamination from the use of an incorrect fluid.

The concept represented here can be applied at very low cost with a reduced number of optical and mechanical components featuring a light source, an optical interface with the sample, and the custom detector system. Some exemplary embodiments of the broad band light source can include a tungsten light bulb, a composite broad band LED such as a white LED or a gas discharge such as a xenon, krypton, neon, deuterium or mercury light source. The wavelengths can be defined by a custom, multi-element detector system, where each detector element of the detector system is combined with a light selecting element, such as a bandpass filter or even a variable filter, as in the case of a multi-element filter-detector combination. The light selecting element can select for a pre-determined wavelength of interest. This exemplary embodiment of the multi-wavelength sensing system overcomes shortcomings of the previous applications by enabling a broader range of wavelengths to be used. By addressing packaging issues, different types of detector elements can be integrated providing a truly multi-wavelength device that can have elements that are sensitive in the UV, visible, near infrared and the mid-infrared, all within a single mechanical package.

If one evaluates the full spectra from the UV to the NIR it is possible to select filters that can provide specific detection for virtually any chemical compound in liquid, solid, gas or vapor form. Therefore, if one considers the application of dedicated detectors as a spectroscopic application then multicomponent chemical sensing can expand beyond the simple applications for liquids and fluids. Combining one or more of these custom detectors can be applied to a range of spectroscopic applications, especially when used with spectroscopic software to perform complex analyses for multicomponent chemical systems. In this way, the present invention can be used as compact low cost analyzers or chemical sensors developed for applications normally associated with the use of high-priced instruments, such as FTIR spectrometers and gas chromatographs.

When designed as a sensor, the sample interface can provide the basic framework of the measurement system, where the light source and detector system can be mounted on or within the assembly. Such assemblies combine the source and detectors with the support and control electronics to become a stand-alone device that can function as an analyzer or an instrument. These can be integrated or embedded into the measurement system, and provide an output that is customized to the target application. When implementing the user must understand the nature of the measurement environment, such as the material being measured, its properties, the operating environment in terms of temperature and pressure, and how it can be optically coupled to the light source and detection system. FIGS. 1 to 5 provide examples of suitable optical interfaces that can be coupled to the basic sensor optical elements (source and detector) and can be applied to a broad range of sample types; liquids and solids.

Exemplary fluid monitoring systems are can be implemented into an automotive, vehicular or heavy equipment application. As set forth above, sensors according to embodiments of the present disclosure may be suitable for fluid monitoring in all modes of equipment operation. The present invention can be used for on-board engine applications such as lubricant, coolant, aqueous urea solutions (dosing into the SCR system) or on-board fuel monitoring, a sensor may be located within a given fluid stream, such as in the feed lines or in the fluid dosing system. Further, a sensor may be configured as a submersible component located within a feed tank (e.g. a urea solution tank or fuel tank).

Sensors according to embodiments of the disclosure may also be used for oil condition monitoring (e.g. oxidation and nitration) in gasoline and natural fired engines. For this application, sensing devices may be located at the output side of an engine's primary (or secondary) filtration system, where a filter is inserted into the stream on the return side of the filter-housing block. Advantages of mounting the sensor on the filter block include convenient access, external mounting, and reduced operating temperature. Alternative positions for the sensors described herein may include the transmission, the coolant system or the rear axle. Another possible sensor position is within a relatively cooler location of the exhaust system, wherein a heat-insulated probe and sensor can monitor exhaust gas for species such as NOx. While many of the embodiments of the present disclosure are described in the context of sensor devices installed on a vehicle or combustion engine-powered system, these serve only as examples. The devices are, as indicated, intended for use in all forms of fluid measurement systems.

Referring generally, sensors according to embodiments of the disclosure may also be used for a wide range of non-automotive applications ranging from refinery applications, process plant applications, power generation applications, including turbines, and other transportation applications. Refinery applications can be overlapped with other applications and can also include the refining process, from the refining process at the front end to the blending at the back end. Measurement of both the composition and properties may occur during the processes as well as the products of the processes, such as LPG (liquid petroleum gas), gasoline, diesel, kerosene, etc. When used in turbines, the most service-related issue leading to breakdown is gear box failure from lubricant oxidation and degradation. Attempting to service a wind turbine is very expensive because of the inconvenience of working in the control house at the top of the turbine structure. Diesel engine maintenance is important to prevent inconvenient breakdown in remote locations away from service and maintenance facilities. On-board sensors in both examples can monitor the lubricant quality and provide onboard diagnostics broadcasted via wireless communications.

In these exemplary embodiments, the present invention can use a solid state light source 101, such as an LED, and a solid state detector package, such as a standard photodiode detector 103 for detection. The photodiode detectors 103 and light source 101 can be packaged together on an opto-board 105 within the sensor. This provides a low cost option and offers a non-species specific measurement of fluids. This sensor can be based on a ~400 nm LED for $NO_2$ and a ~700 nm LED for a reference baseline. This sensor can also be implemented with a remote insertion probe, or the LED light sources may be mounted outside the sensor enclosure and a measurement chamber 117 may be close coupled. A coupling apparatus or sensor body 129 can be configured to couple said light source 101 and said detector 103 proximate to the chamber 117. The measurement chamber may have a light guide 107 using any suitable material, such as quartz, fused silica, or any other material or combination thereof. The light path 109 can be directed through the light guide 107. The measurement chamber 117 can be open and formed in between a void of the light guide 107.

Figure 1B:
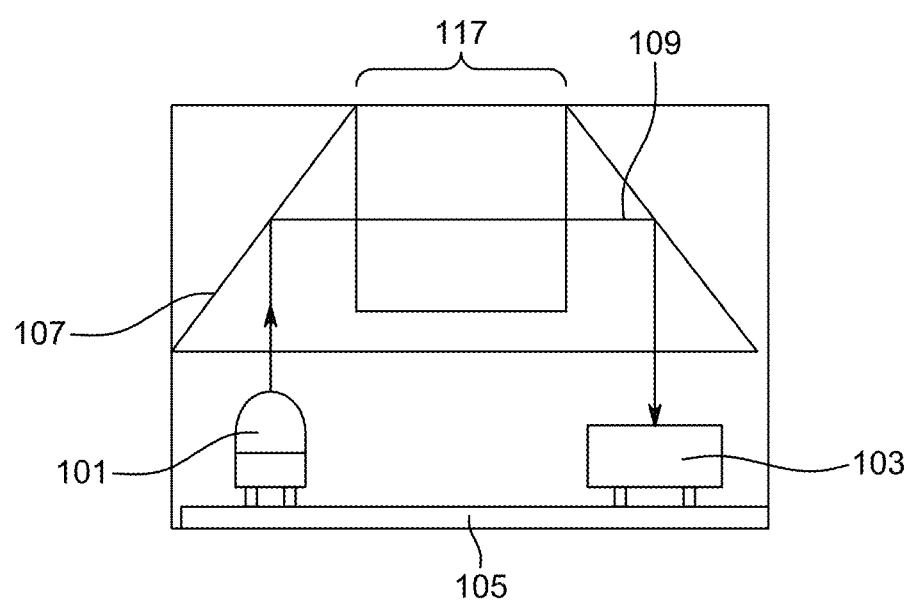
FIG. 1B is an illustration of an exemplary embodiments of compact refractive optical elements that can be used for the sensor of the present invention.
Figure 1C:
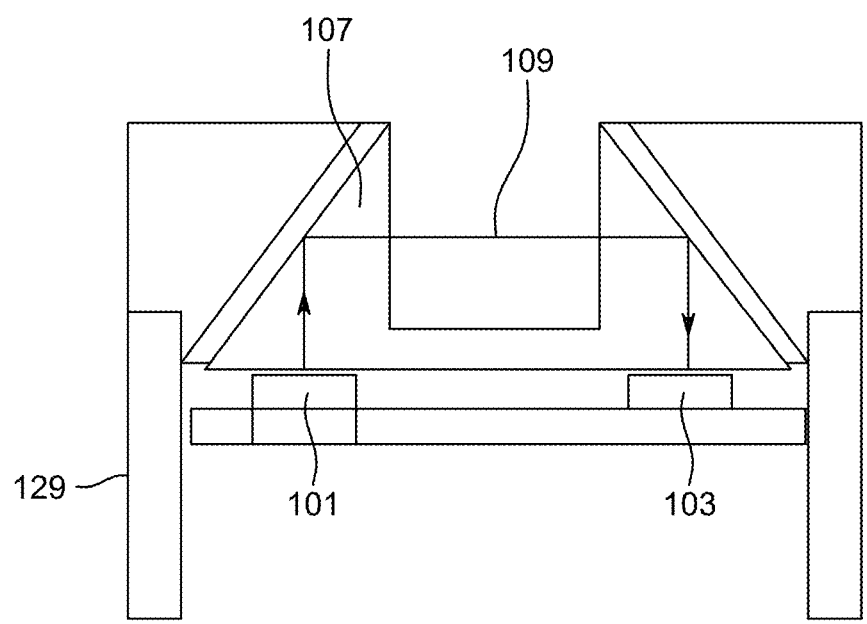
FIG. 1C is an illustration of an exemplary embodiment of compact refractive optical elements that can be used for the sensor of the present invention.

FIGS. 1A-1C are illustrations of various embodiment where the optical elements can be set on the tip of a probe that could be immersed in the fluid for measurement. In other variations the optics still apply, and the light source is a broadband, multi-wavelength source, and the detector is a multi-wavelength composite detector system, that can have individual detectors, each with optical filters for different pre-determined wavelengths. This provides a low cost construction and can be used for internal reflectance and transmission methods of measurement. When properly designed and concealed correctly this sensor can be applied to high pressure applications where the tip of the sensor can be immersed into a static or dynamic fluid flow, such as in an oil line, a holding tank, hydraulic or cooling fluid line, or any other high pressure environment.

Figure 2A:
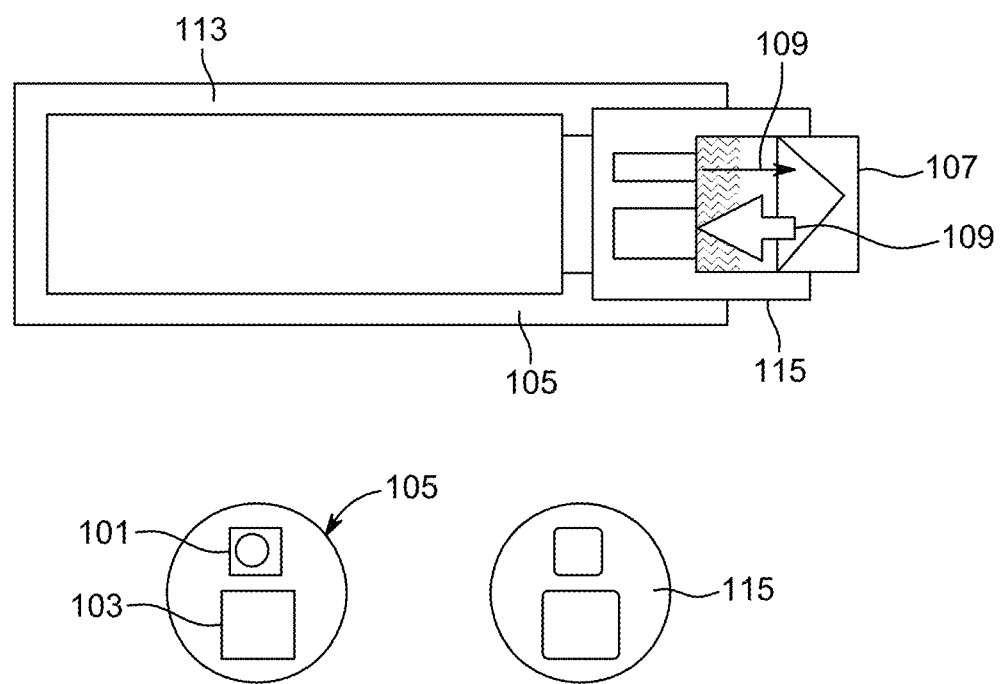
FIG. 2A is an illustration of a preferred embodiment of an insertion probe sensor for location on a bulkhead.

The sensor shown in FIG. 2A takes the approach shown in FIGS. 1A-1C one stage further, by packaging the sensing head to hold it in place, and can provide a means of mounting and sealing. An optical isolator 115 can also be used to isolate the light source from the detector module 101, detector, or photodiode. This exemplary embodiment can be implemented as an insertion probe installed as a bulkhead style sensor fitting (2B and 2C). The bulkhead embodiment can provide protection of the critical optical sensor elements while providing an optical interface between the internal optics and the fluid, which can be static (storage) or dynamic (flowing).

A coupling apparatus for coupling said solid-state source and solid-state detector to the measurement chamber can be used in the real-time measurement sensor. The measurement chamber may also include a single component optical interface fabricated as a refractive optic 107 that works in an internal reflectance or optional transmittance modes (or light scattering or fluorescence modes). Integrated electronics 113 that include circuits that provide optical compensation, temperature sensing and compensation, analog and digital signal processing, and external communications are communicatively coupled to the sensor. The integrated electronics 113 can also be communicatively coupled to the opto-board 105 or alternatively integrated as part of the opto-board 105. The system is designed to allow a high level of integration of both electronic and optical components, and to include packaging that provides both thermal isolation and ease of assembly and manufacture. Fiber optics or other forms of optical light guide or light conduit may be used, with appropriate source collimation and detector collection optical elements.

Figure 2B:
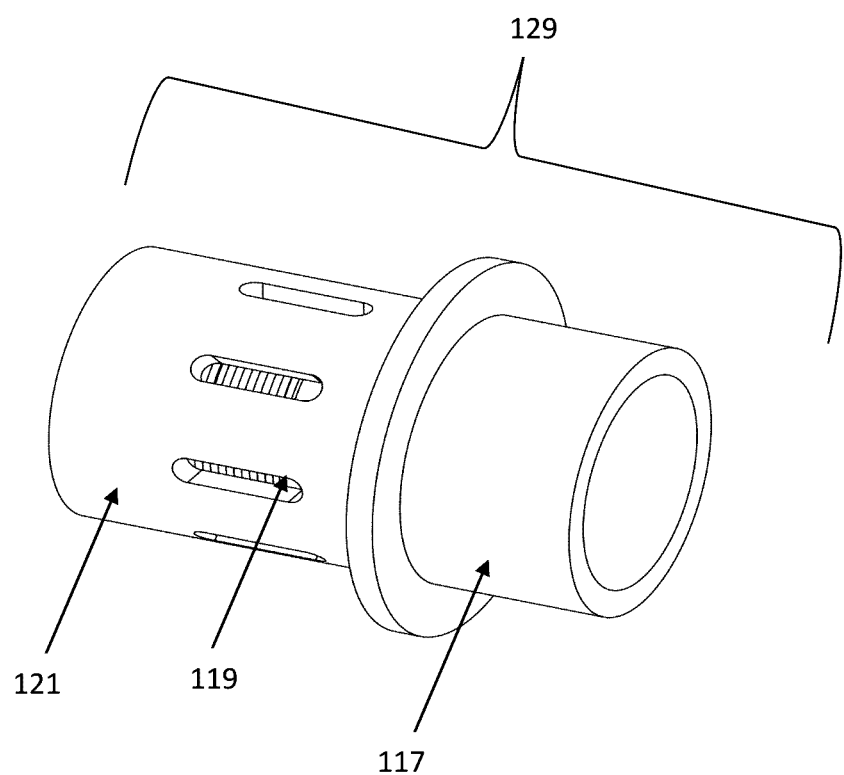
FIG. 2B is an illustration of a preferred embodiment of an insertion probe within a pipeline having flowing fluid.
Figure 2C:
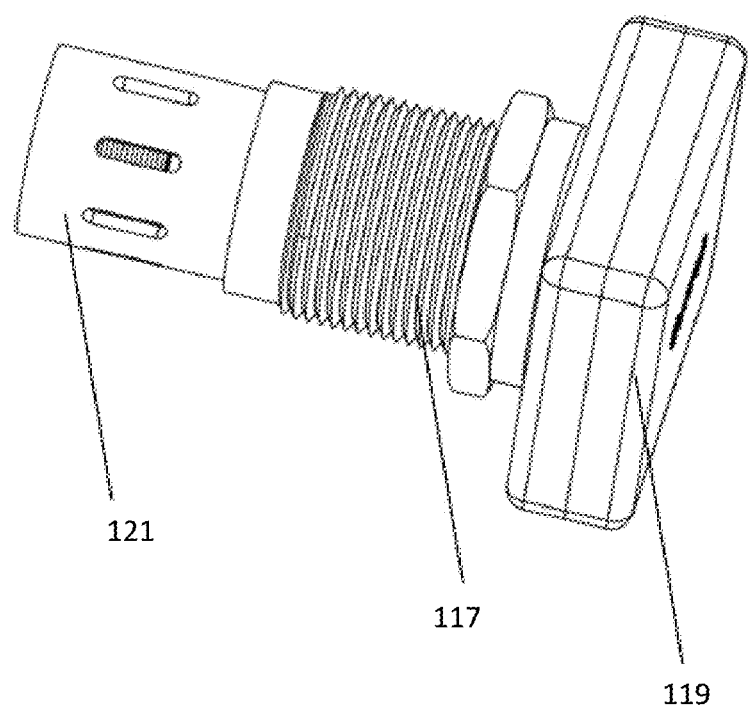
FIG. 2C is an illustration of a preferred embodiment of an insertion probe within a tank.

FIGS. 2B and 2C are exemplary embodiments of a low cost insertion probe embodiment of the present invention, which can have close-coupled and combined electronics integrated with the sensor. This embodiment can be used for coupling to fuel or lubricant systems where the fluid enters the through the walls 121 of the sensor body 129 of the probe and the light source energy passes through the fluid. The returning energy is separated into measurement channels of a measurement chamber 117 by the coupled detector system 119 having at least one detector with an optical filter. This type of sensing system can be fabricated for a minimal cost and in a high volume. As shown, the device can function as a stand-alone sensor, and can have embedded tools and analytical members to provide a detailed analysis for lubricants (e.g., oil condition), hydraulic fluids (e.g., quality and moisture content), coolants (e.g., for quality and potential degradation) and dosing fluids, such as urea solutions for SCR dosers. The embodiment in FIG. 2B illustrates an embodiment where the fluid can flow through the probe and put in line with hose or fluid line. The analytical members of the sensor convert the optical signals from the individual detector channels into results that directly correlate with the properties being measured by the sensor. This can include properties, such as but not limited to, quality (e.g., degradation of oils, or the grade of fuels), levels of contamination (e.g., moisture content, hydraulics) or component concentration (e.g., urea in SCR dosing fluids or glycol in coolants)

Figure 3A:
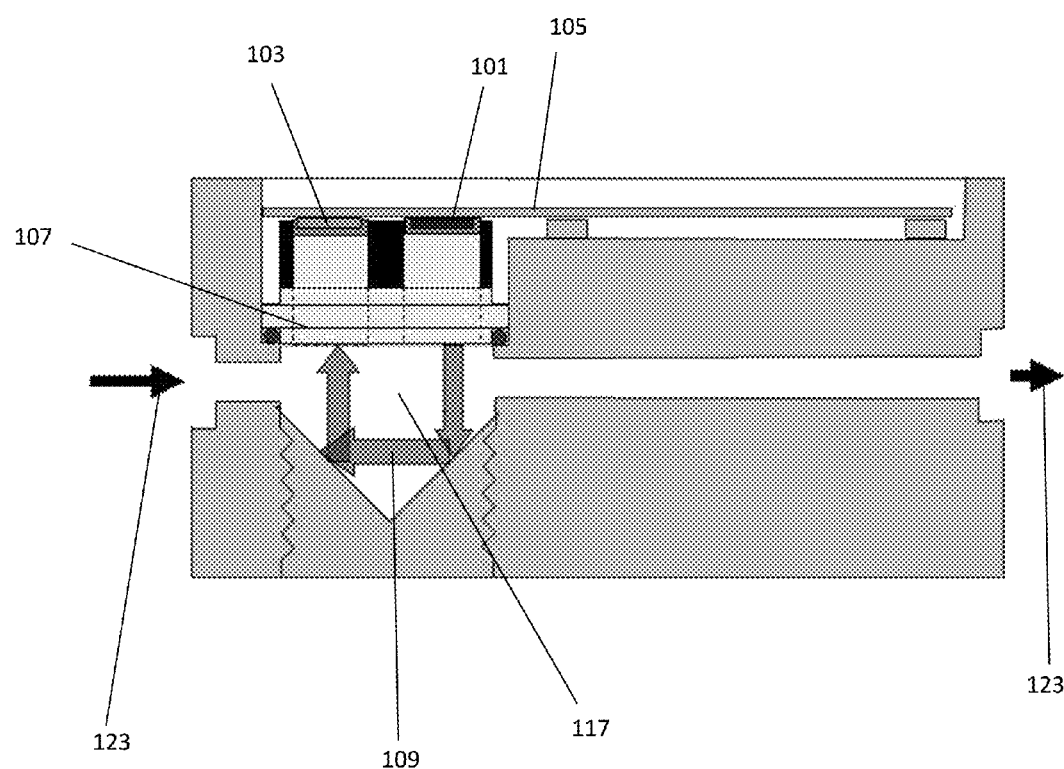
FIG. 3A is an illustration of an exemplary embodiment of an in-line sensor.
Figure 3B:
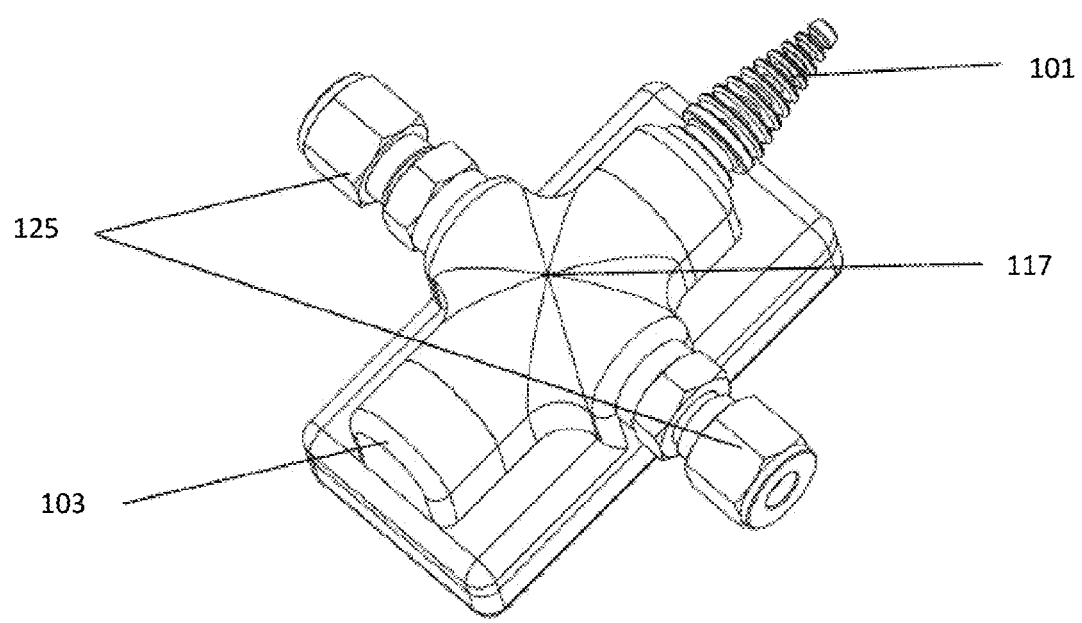
FIG. 3B is an illustration of an exemplary embodiment of an integrated in-line sensor head with close coupled dedicated electronics.

FIGS. 3A and 3B, are exemplary embodiments of sensors described in the present disclosure implemented as in-line flow through packages, similar to the embodiment illustrated in FIG. 2A. For example, FIG. 3A is a cross-sectional view illustrating an in-line (flow-through) sensor with an adjustable retro-reflective insert, and an electronics package/opto-board 105 including at least one light source 101 and at least one detector 103. This interchangeable insert may be used for fine adjustment of the optical path length 109, or reflector type, without the need to replace the entire sensor package. As illustrated, energy from light source 101, which is typically a broadband light source emitting multiple wavelengths, passes through the fluid in the chamber 117 and back to detector 103 along the path shown 109 in FIG. 3A. The transmitted energy, which can include deep UV to the upper limits of the infrared spectrum interacts with the sample fluid, with the characteristic absorptions of the fluid modifying the light transmission of the fluid, and is subsequently sensed by a detector system, having at least one detector. The in-line flow through sensor allows a fluid to flow through the sensor and measurement chamber while the sensor is in operation. The fluid path 123 is illustrated in FIG. 3A and flows through a first end of the sensor through to a second end of the sensor. The selectivity of the absorption is defined by the optical filters integrated with the individual detectors of the detector system. The detector system can include a plurality of detectors each with an optical filter for different wavelengths.

FIG. 3B is another exemplary embodiment of an in-line flow through sensor that can be optimized for the mid-wave and longer wavelength NIR where a path length of about 10 mm or is necessary to be suitable to the application. This sensor can include connectors 125 in communication with chamber for interfacing with a fluid feed path (e.g. a fuel line). This complete package can include a close coupled electronics interface and can have about 8-channels available for the monitoring of about 8 independent wavelengths. This smaller path length can allow the sensor to be packaged even smaller and requires a smaller sample size that can aid in preventing environmental factors, such as freezing, from affecting the sample.

The sensor can use any suitable coupling 125, such as a standard Swagelok®, Circor® or Parker® style compression coupling, which can be attached to an inner chamber 117 and fitted with sealed windows. The sealed windows can use any suitable material, such as quartz, sapphire, barium or calcium fluoride. The light source 101 and detector 103 can be juxtaposed to optimize optical coupling. Additionally, the electronics can be close-coupled to reduce connector wire lengths and minimize signal pickup. The entire package is optimized for size and optical/pneumatic efficiency for gas measurements.

Figure 4A:
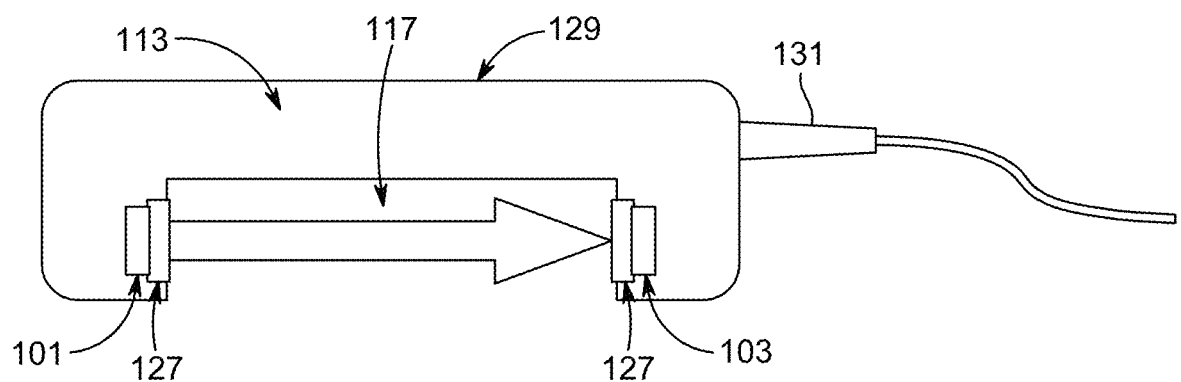
FIG. 4A illustrates an exemplary embodiment of an immersible transmissive sensor.
Figure 4B:
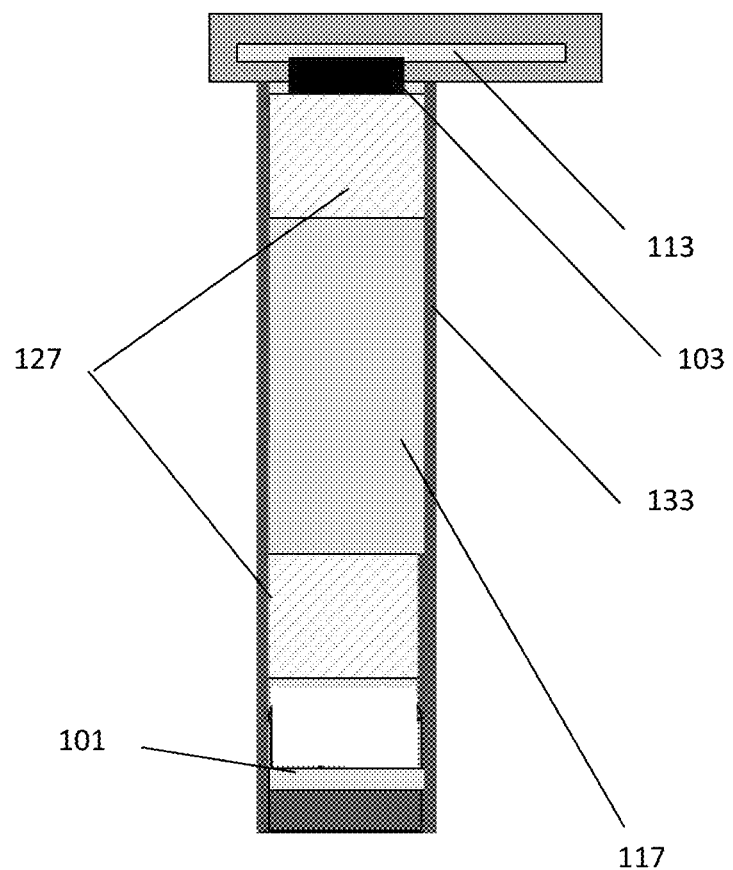
FIG. 4B illustrates another an exemplary embodiment of an in-tank sensor for measuring both fluid level and composition of a sample.

The integrated reflective sensor embodiments shown in FIGS. 2A-2C and FIGS. 3A-B may have a challenge interfacing with fluids depending on location or representative sampling for the measurement. Other applications may have few limitations in terms where the sensor has to be placed, such as the case where the fluid is stored in a tank and the sensor can be submersed in the fluid. This can be beneficial for applications where the sensor ideally should be used at a temperature close to that of the fluid. FIG. 4A is an exemplary embodiment where the electronics and the optics can be in a package that can be used as a submersible sensor within a storage or dispensing tank. This sensor can operate in a "staring" mode, wherein an electronics package 113 can include a broadband light source 101 and a detector system 103 that can have a plurality of detector elements with optical filter for various specific wavelengths. The light source 101 and detectors 103 can be generally located opposite one another, between which is arranged a sensing area or measurement chamber 117. While the sensor can be used as a submersible sensor that can be located within, for example, a fluid dosing tank, it can also be integrated into a flow-through system. The sensor can also include molded lenses 127 to protect the light source 101 and detector 103 from direct exposure to the fluid. The sensor can have a molded enclosure 129 that packages the light source 101, detector 103, and integrated electronics 113 and configured in a way to position the light source 101 and detector 103 opposite of each other to form the sensing area 117. It can also allow for connection to a power source 131.

In one alternative in-tank embodiment of the present disclosure for measuring both fluid level and fluid quality/composition in an in-tank application. Similar to the embodiment illustrated in FIG. 4B, in this staring mode embodiment, the path length is defined by the volume of fluid in a tank and the anticipated depth of fluid. In this embodiment, the depth to be measured may be of a liquid, and not of a gas, the volume above the level of the liquid being of gases. More specifically, sensor is housed in an elongated porous body or housing 133, which may be in the form of a hollow tube, which may be cylindrical. The active components, a light source 101 of the sensor may be mounted at the lower end of housing. The receiver or detector 103 may be arranged on an opposite end, for example, at the top of tank with the associated control and data processing electronics 113. The light source 101 and detector 103 may be so arranged and oriented that the light source transmits radiation along body from one end to another, and may further in an embodiment transmit radiation through the hollow interior or sample chamber 117 of the body 133 to detector 103. The sensor can also include molded lenses 127 to protect the light source 101 and detector 103 from direct exposure to the fluid.

The mounting of the light source 101 within the hollow body 133 may tend to protect light source against physical shock. Wiring to transmit power and control signals to light source may be within the hollow body; in embodiments, light source 101 may be packaged in a sealed unit including one or more batteries or other internal or external source(s) of power. In this embodiment, the absolute absorption measured may be correlated initially to path length or depth of fluid, and the relative absorptions of the fluid components are determined and correlated to the ratio(s) of the main components. More specifically, sensor may be used in a measuring process for determining the depth of a volume of fluid. In one embodiment, a light source is operative to transmit light energy through a volume of fluid. This energy is subsequently detected by a detector 103. A comparison can be made between the magnitude of energy transmitted by the light source and the magnitude of the energy received by detector to calculate energy absorbed by the fluid. Finally, this absorption value is compared to a predetermined absorption vs. depth relationship, which may be stored in a memory device incorporated in electronics, for estimating or determining the depth of the fluid. This estimated or determined depth value may be output to, for example, a display device. As will be understood by one of ordinary skill in the art, these calculations may be performed by processing components incorporated into the control electronics (e.g. electronics).

Figure 5A:
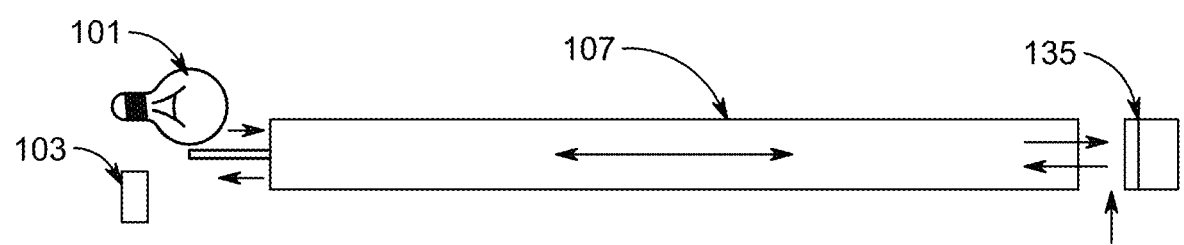
FIG. 5A is an exemplary embodiment of remote sampling probes.
Figure 5B:
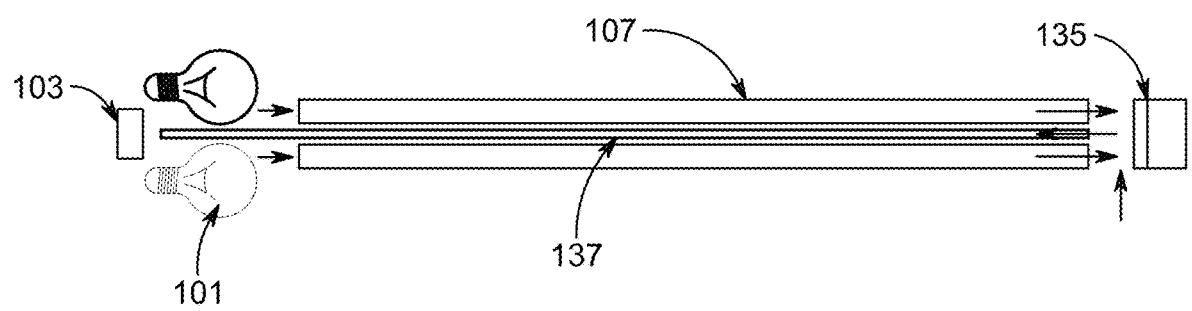
FIG. 5B is an exemplary embodiment with a fiber optic coupling.
Figure 5C:
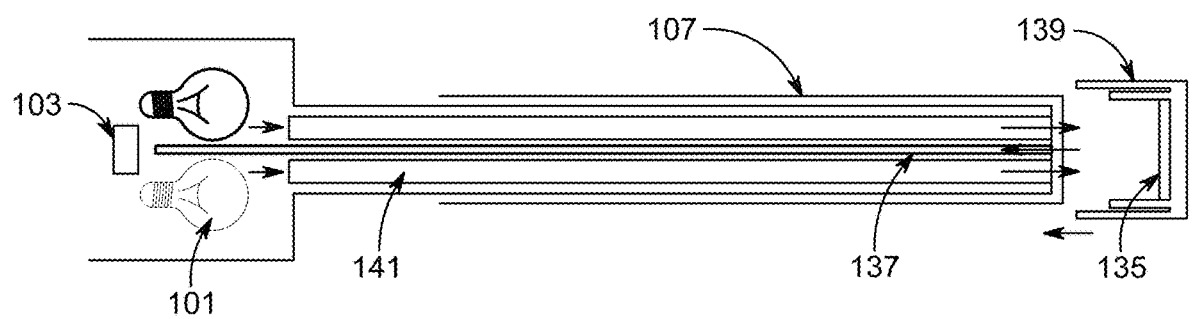
FIG. 5C is an exemplary embodiment of a sampling probe configured for dip sampling in tanks with disposable elements.

A remote sampling sensor embodiment of the present invention is shown in FIGS. 5A-5C. In this embodiment a sample interface can be used for making the measurement head remote from the measurement optics. The measurement head being remote from the electronics of the sensor can be beneficial if the measurement point is inside a large piece of equipment, or if the actual measurement is to be made at elevated temperature or in an "alien" environment where it is beneficial to isolate the measurement components (optics and electronics) remote from the fluid or gas stream. FIG. 5C is a variant of this concept where the optical probe can be used in a "dipping" configuration, and where disposable elements can be added to make the probe reusable or maintained clean, free from contamination.

FIG. 5A is the most basic form of implementation where the light from the source 101 is transmitted down a solid light guide 107 or conduit through the fluid to a retro-reflective optic 135, where the beam is returned to the composite detector 103 (filter/detector combination). FIG. 5B is a variant of the design shown in FIG. 5A where the light from the source 101 is transmitted down a hollow conduit or light guide 107, and the returned retro-reflected light is transmitted back to the composite detector via a fiber optic cable 137. FIG. 5C provides an optional form of this concept where the optical probe can be used in a "dipping" configuration, and where disposable elements, such as a disposable tip 139 having the reflective optic 135 and a disposable sleeve 141 enclosing at least a portion of the light guide 107 can be added to make the probe reusable or be maintained in a clean condition, effectively free from contamination. In this exemplary embodiment the external surfaces of the dipping probe are protected by a removable and optionally a disposable covering or sheath. This may be useful where cross-contamination of fluid may occur within the sampling process, or where the fluid may be corrosive and the sheath provides protection.

Figure 6:
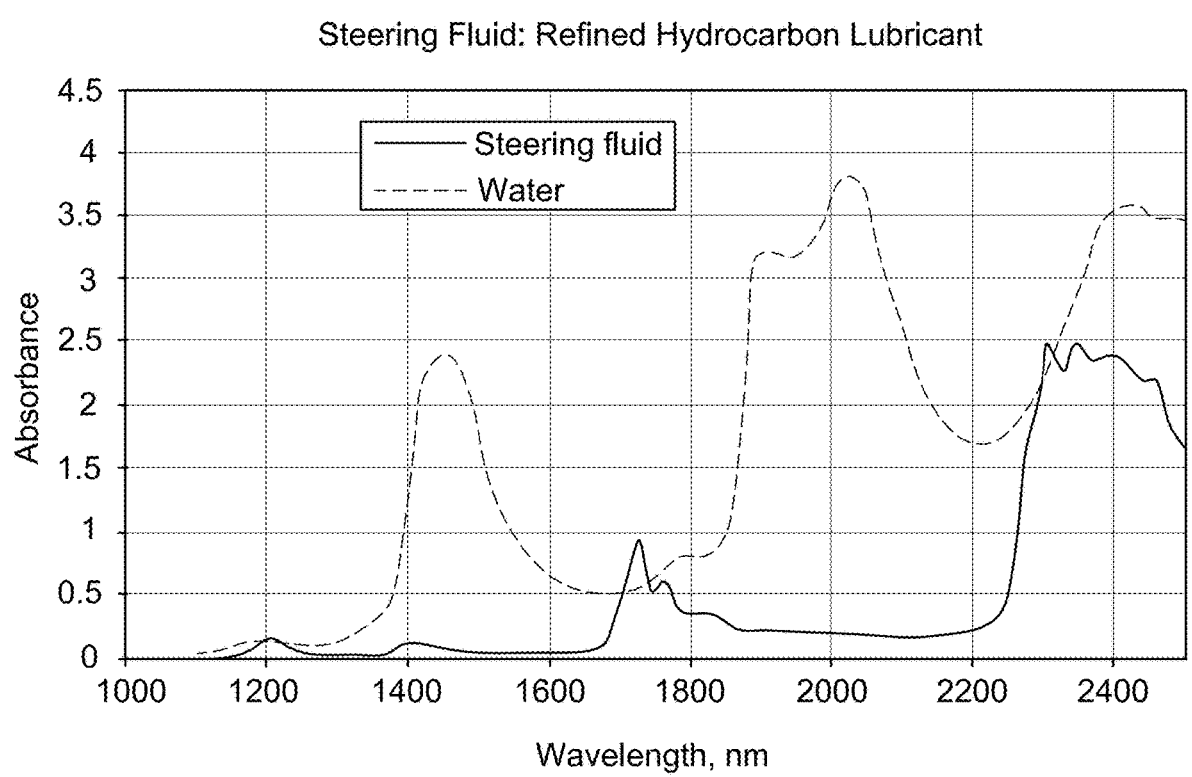
FIG. 6 is NIR spectral data for refined hydrocarbon compared to water for moisture measurements.

Several of these implementations can be equally applied to gases and solids, as powders and sheets of materials. The main spectral regions covered by this invention are the start of the visible to the end of the near infrared, effectively about 350/400 nm through to about 2500/2600 nm, but can also extend into the UV to far UV range as well (about 190 nm-about 400 nm). One of the first applications than the present invention can be applied to fluid condition monitoring of hydraulic fluids. One of the most important measurements is for moisture or water ingress where an environmental seal has failed, and where traces of water/moisture enter the oil system leading to further seal failure, which can cause leakage or corrosion. The spectra shown in FIG. 6 illustrate the clear differentiation between the water spectrum and the hydrocarbon spectrum of the lubricant/hydraulic fluid. This type of sensor, which can be implemented as either in a flow-through FIGS. 3A and 3B or a bulkhead FIGS. 2A-C configuration, can located in both high and low pressure locations of hydraulic system. Other properties can be measured, including oil/fluid degradation and the presence of particulates and debris.

Figure 7A:
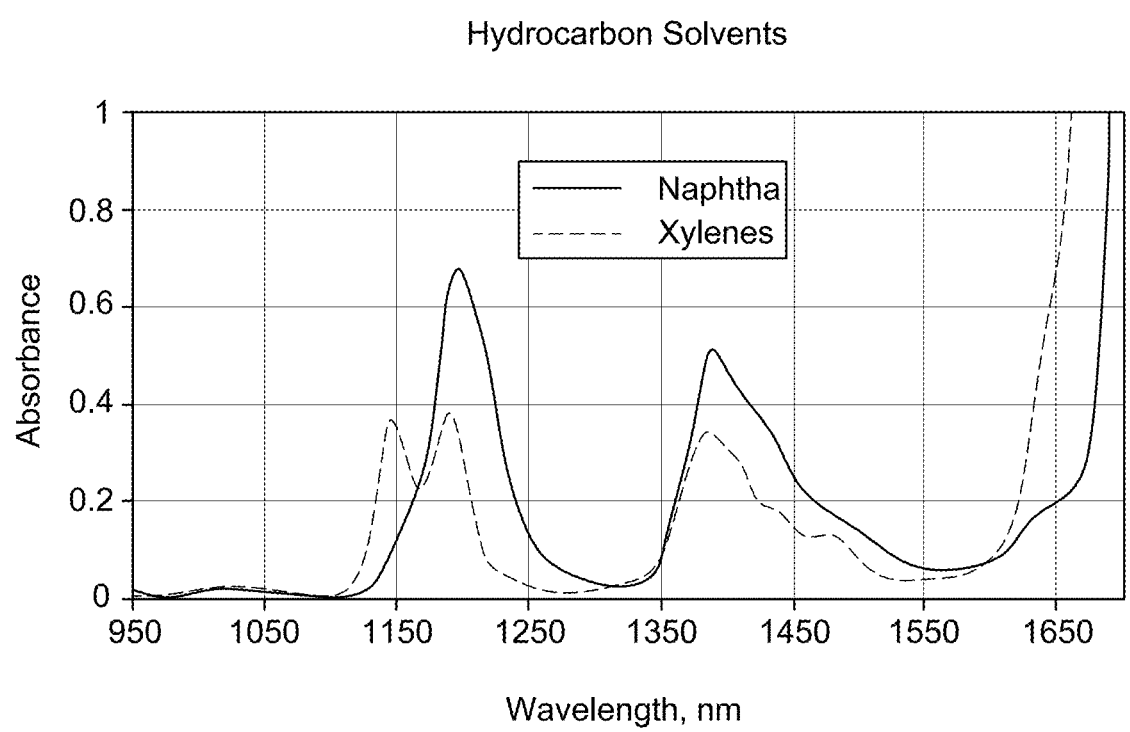
FIG. 7A is NIR spectral data for refined hydrocarbons and fuel components.
Figure 7B:
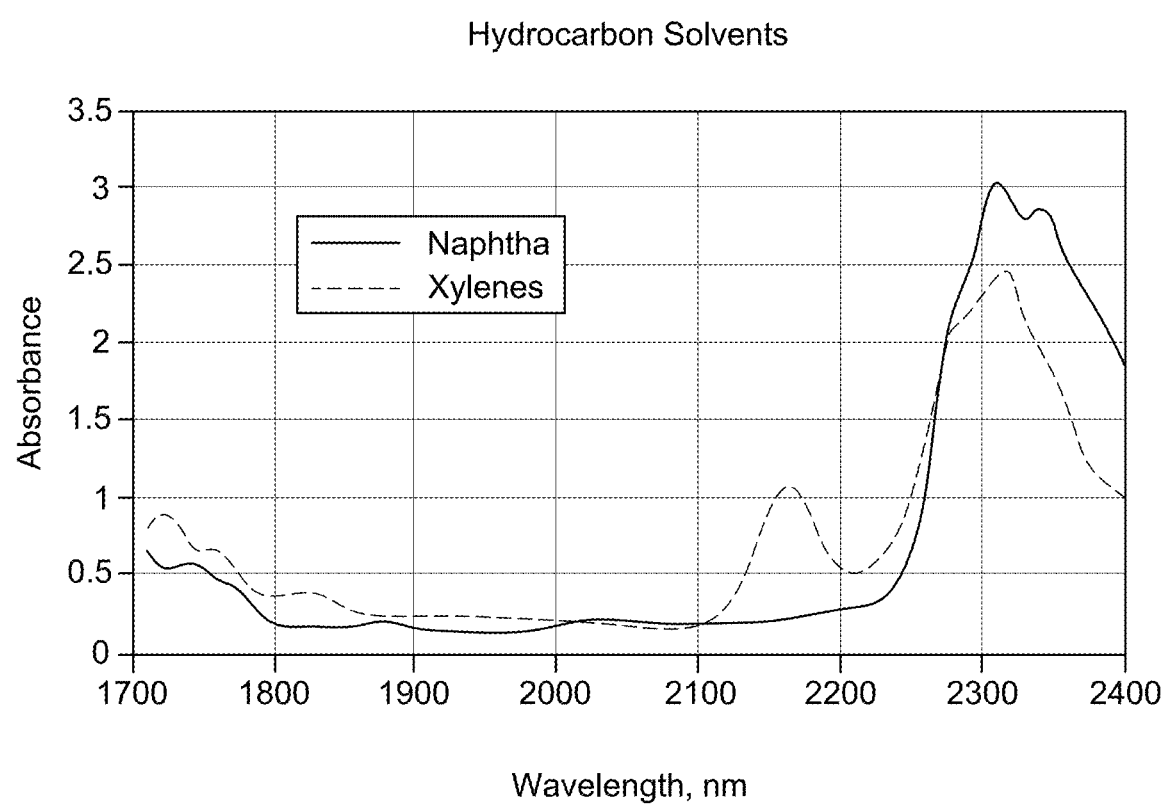
FIG. 7B is another NIR spectral data chart for refined hydrocarbons and fuel components.

One of the important benefits of the new version of the technology is the broad spectral range that can be covered. Measurement of liquid mixtures is an important area of application and measuring over a broad wavelength range allows for materials in mixture to be easily differentiated, and this is important for applications such as the onboard measurement of fuel components and fuel quality. FIG. 7 illustrates and comparing two of the important hydrocarbon components, representing aliphatics (naphtha) and aromatics. Onboard a vehicle, such differentiation can be used for the switch-over from normal petroleum fuels and bio sourced fuels, which can provide important fuel performance differentiation. A simple, low cost version of the spectral sensor (4- or 8-channel versions) can be used as an inexpensive onboard analyzer systems.

Figure 8:
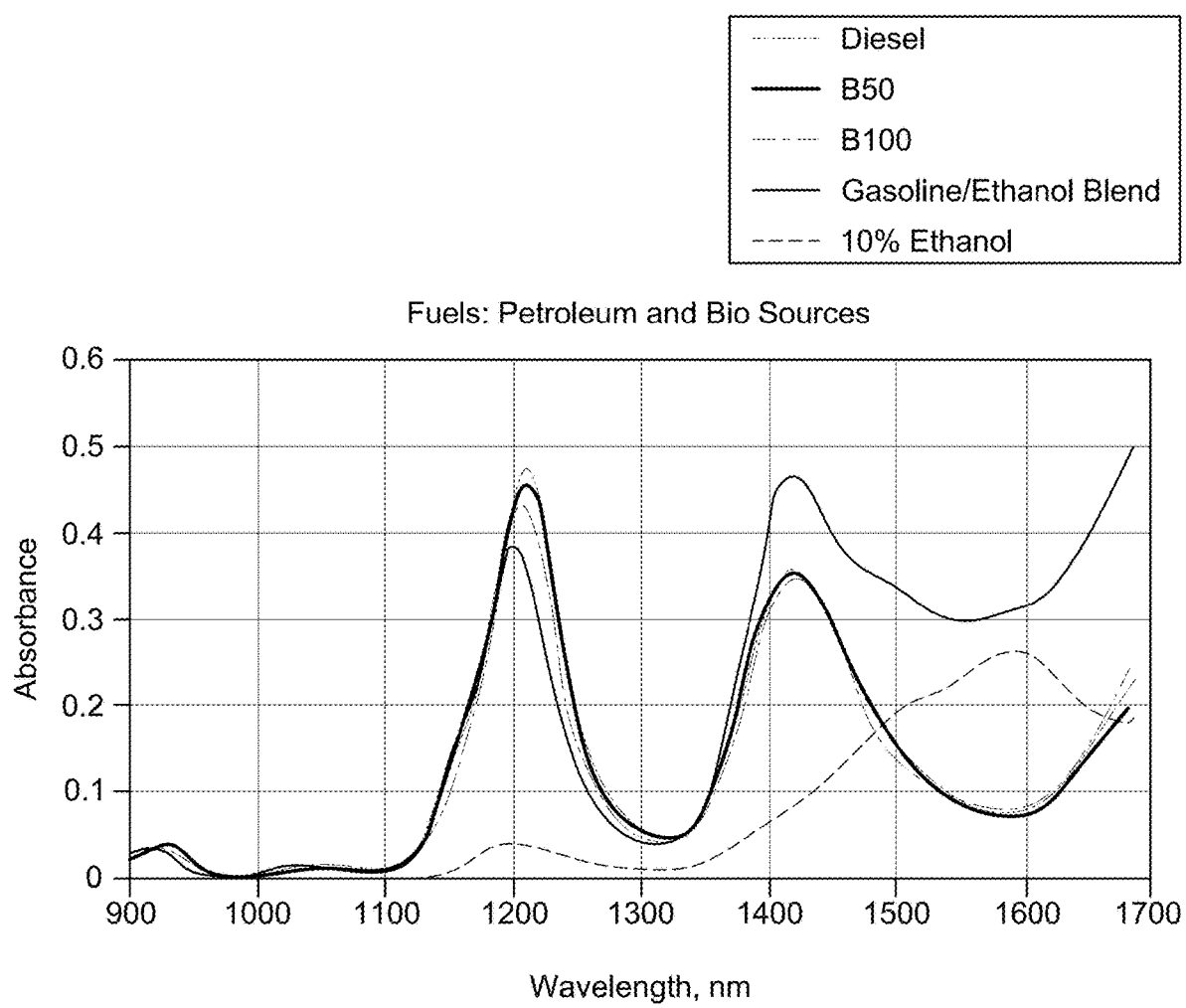
FIG. 8 is NIR spectral data for fuels of petroleum and bio sources, such as biodiesel and flex fuel.

FIG. 8 illustrates the NIR spectral data for fuels of petroleum and bio sources, such as biodiesel and flex fuel. Lubricant, fuel and fluid monitoring applications are good applications for a quality monitoring system on board a vehicle. There are other important fluids on board a vehicle and their quality is also important. In the case of coolants, loss of water or coolant can be indicative of an important service related issue, such as failure of a coolant system, or contamination by coolant can lead to catastrophic mechanical failure. In yet another application, the sensor can be used for monitoring of the quality of dosed fluids such as aqueous urea solution (FIG. 9), used in modern HD diesel engines to reduce NOx emissions. Both fluids can be easily monitored for quality by the use of a NIR based spectral sensor. Gasoline, diesel, B50, and B100 all have a very similar spectral absorbance at similar wavelengths. Gasoline has a slightly different absorbance than the level at similar wavelengths to the other three. The 10% ethanol primary absorbance occurs at a 1600 nm rather than around 1400 nm like the other fuels.

Figure 9A:
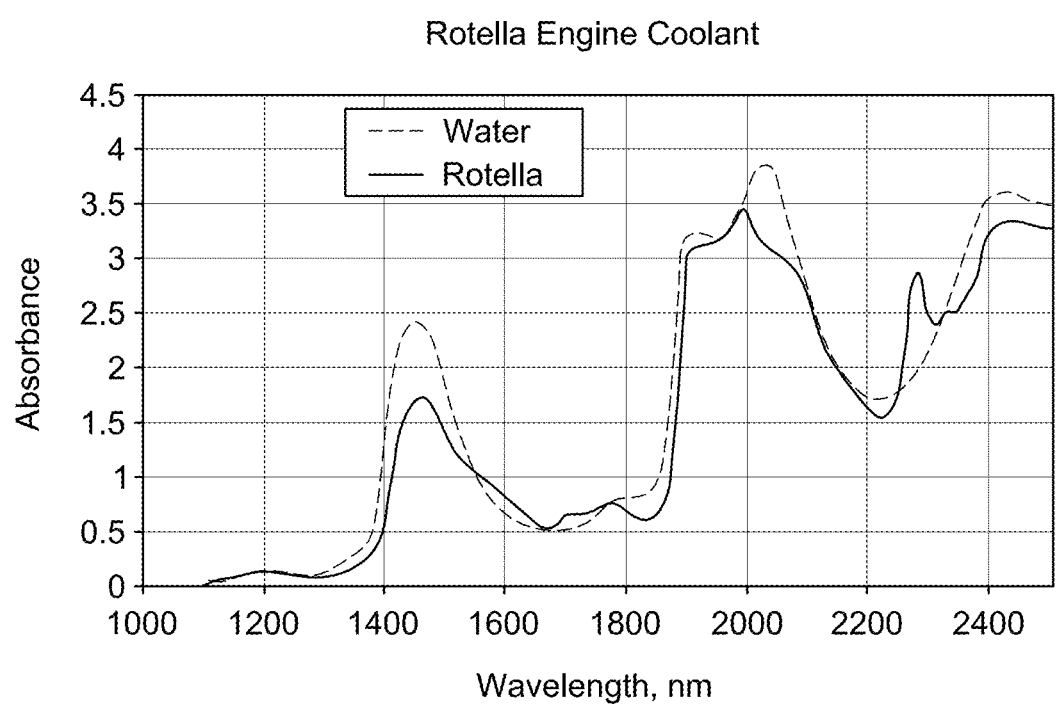
FIG. 9A is NIR spectral data for aqueous based automotive functional fluids, such as engine coolant Rotella®.
Figure 9B:
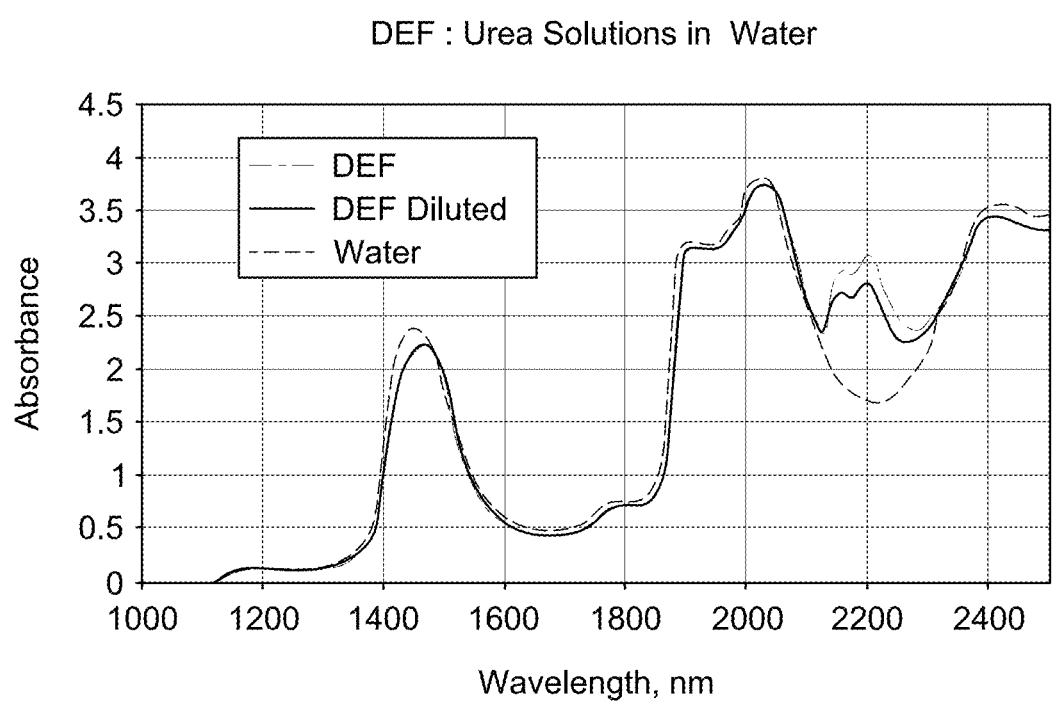
FIG. 9B is NIR spectral data for aqueous based automotive functional fluids, engine coolant and DEF urea solutions.

The present invention can focus on automotive fluid monitoring for lubricants, fuels and other functional fluids, such as coolants in FIGS. 9A and 9B. Both water and Rotella® cooling fluid have very similar spectral readouts. The sensors are important in other areas of application, in particular for in-line and on-line process monitoring for production related applications. This is an important shift in focus for manufacturing production and process control where the real-time analysis of liquid or gas related processes are handled by complex high cost measurement systems. A typical monitoring system features complex instrumentation combined with difficult to implement sample handling and interfacing. The systems described in this disclosure are fully integrated measurement systems that integrate the optics, sampling interfacing and electronics to provide a low-cost and versatile measurement system that can implemented in many different locations within a process. THE DEF coolant have very similar spectral readouts as water, however, the DEF solutions have absorbance peaks around 2200 nm.

Figure 10A:
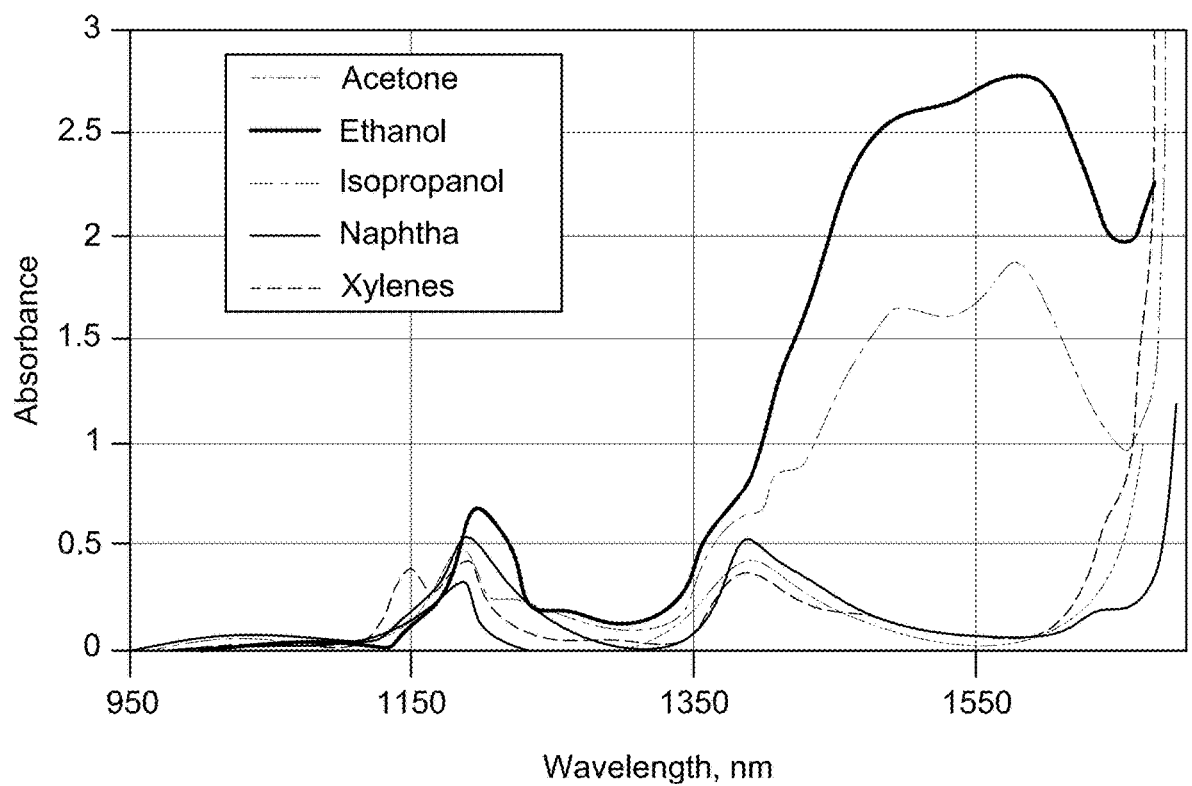
FIG. 10A is NIR spectral data for non-automotive, industrial and petrochemical, solvents.
Figure 10B:
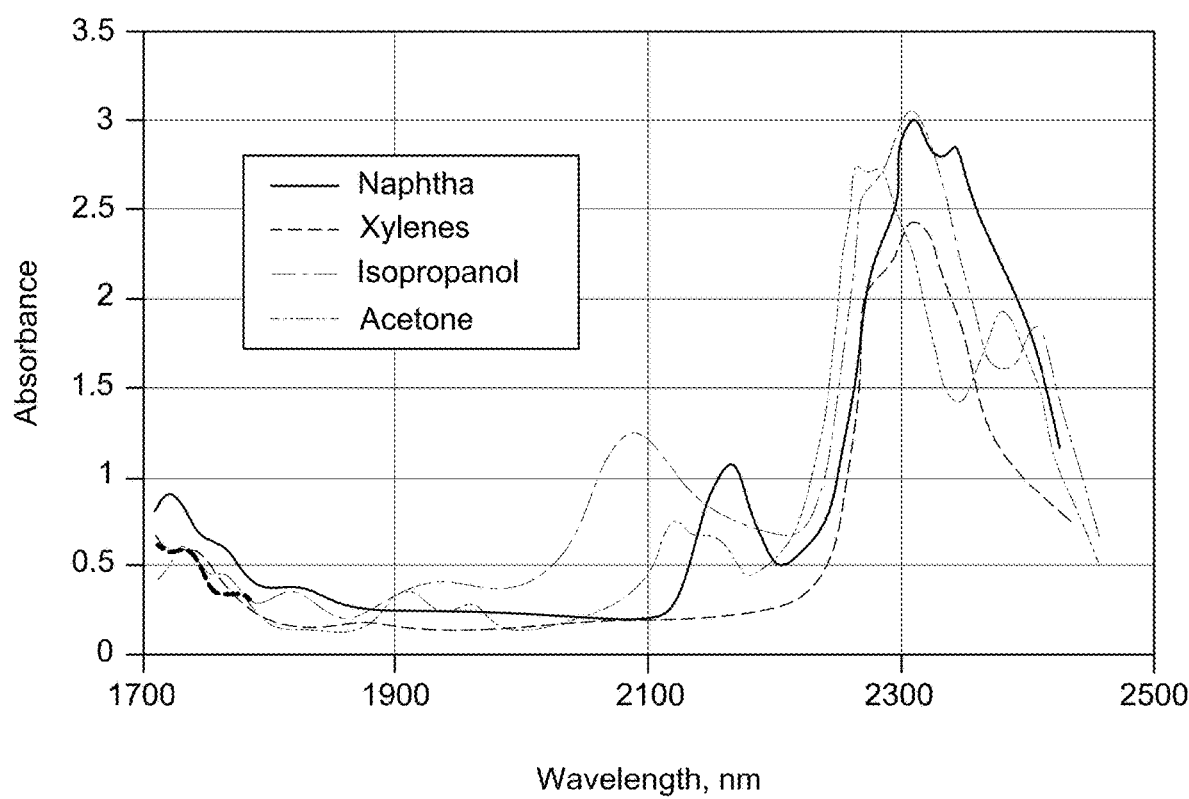
FIG. 10B is NIR spectral data for non-automotive, industrial and petrochemical, solvents.
Figure 11:
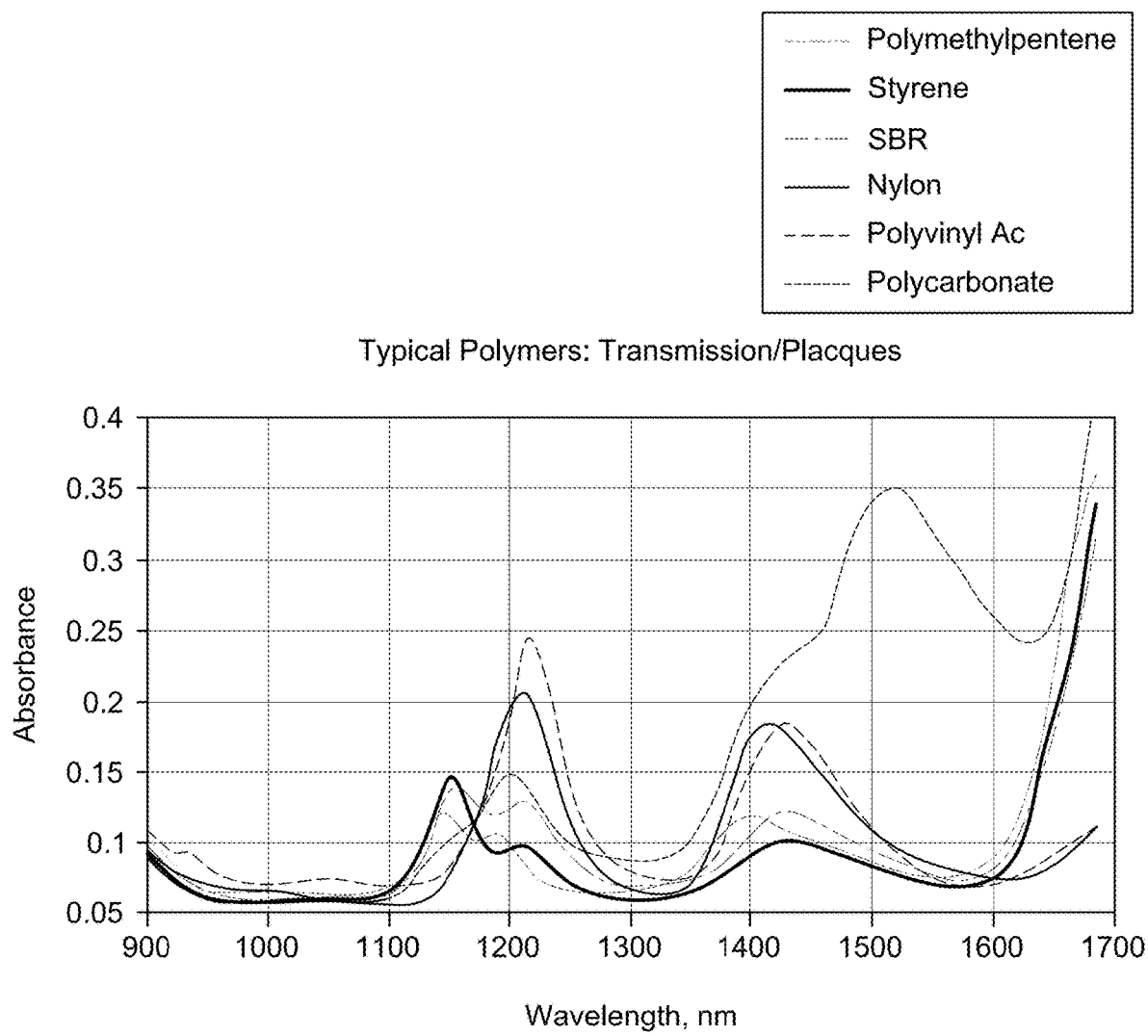
FIG. 11 is NIR spectral data for non-automotive; industrial and petrochemical, polymers and plastics.
Figure 12A:
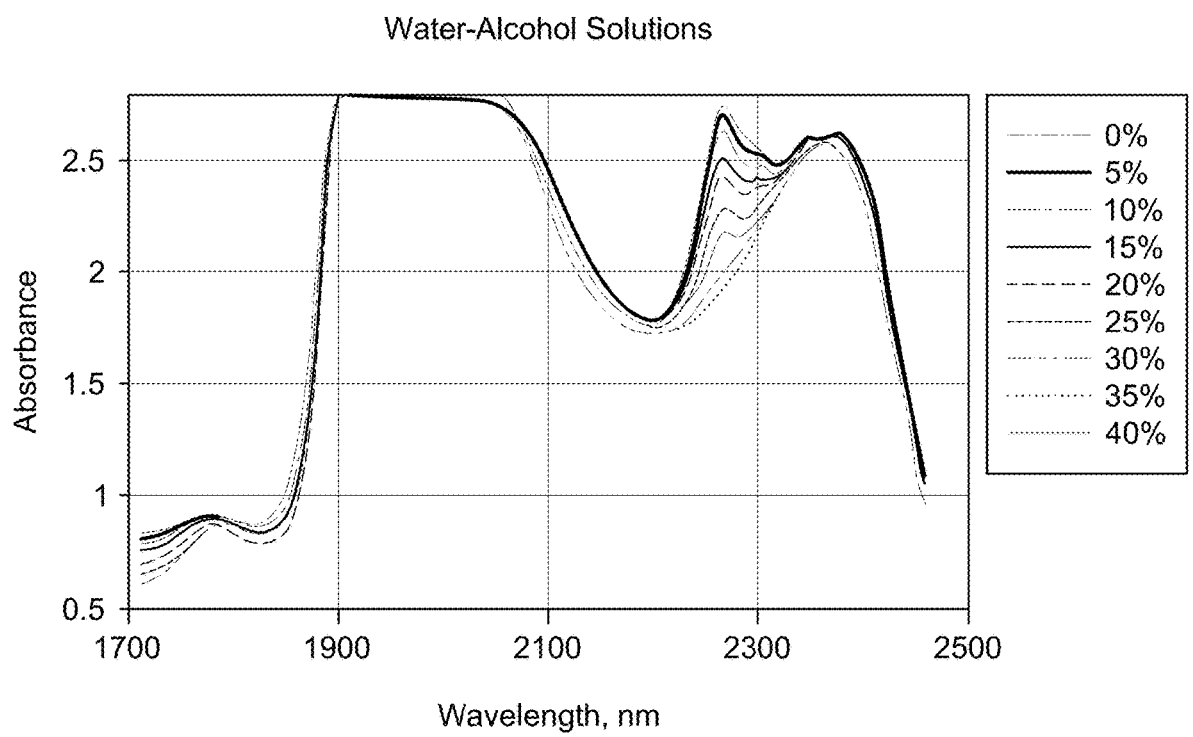
FIG. 12A is NIR spectral data for non-automotive; industrial and agricultural grain ethanol production for biofuels and beverages.
Figure 12B:
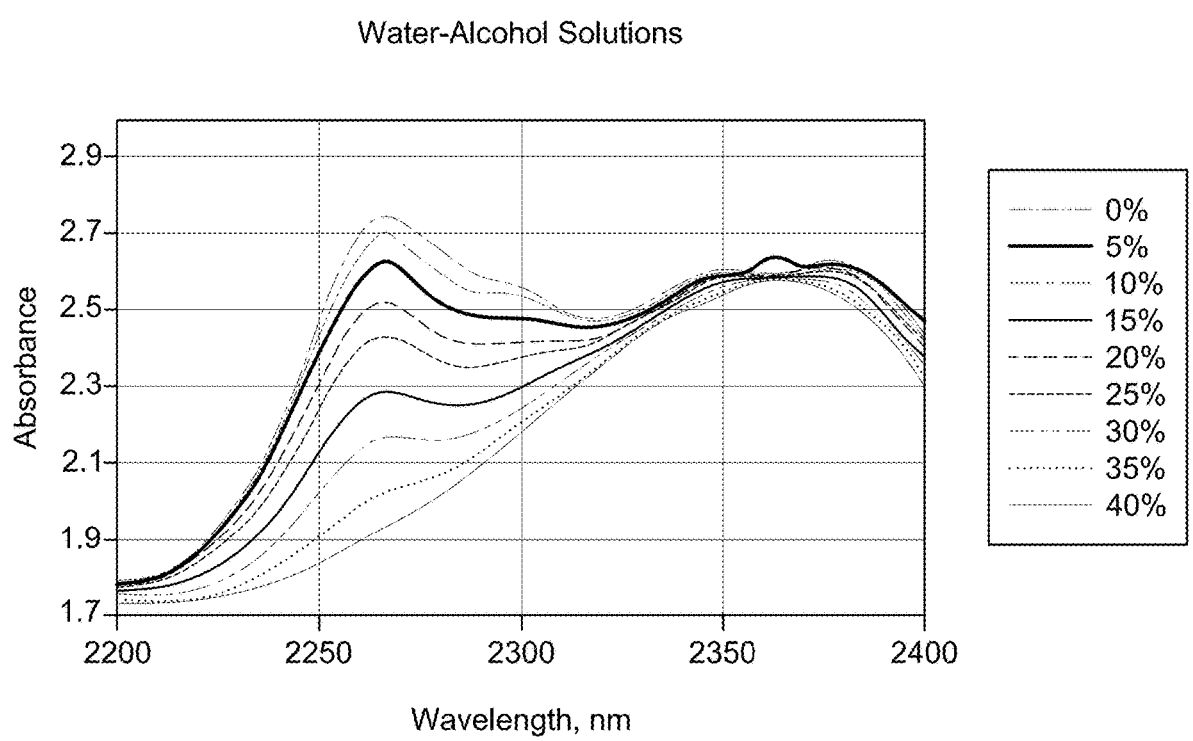
FIG. 12B is NIR spectral data for non-automotive; industrial and agricultural grain ethanol production for biofuels.
Figure 12C:
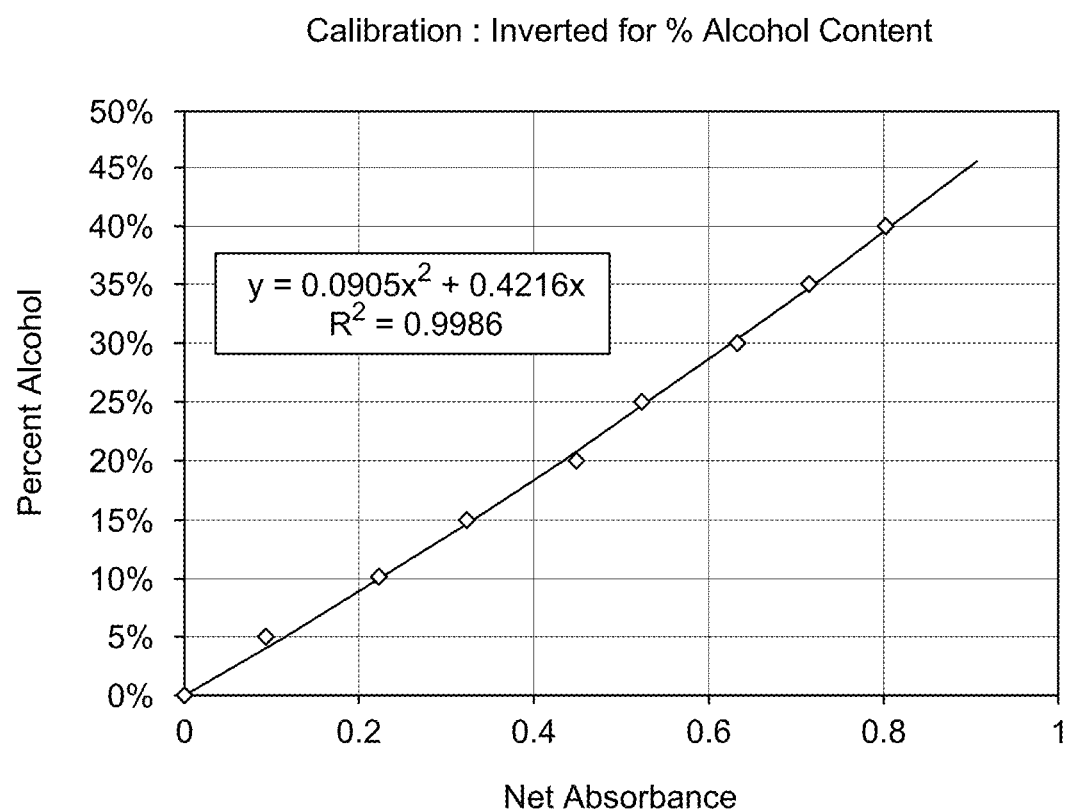
FIG. 12C is a calibration curve for non-automotive; industrial and agricultural grain ethanol production for biofuels.
Figure 12D:
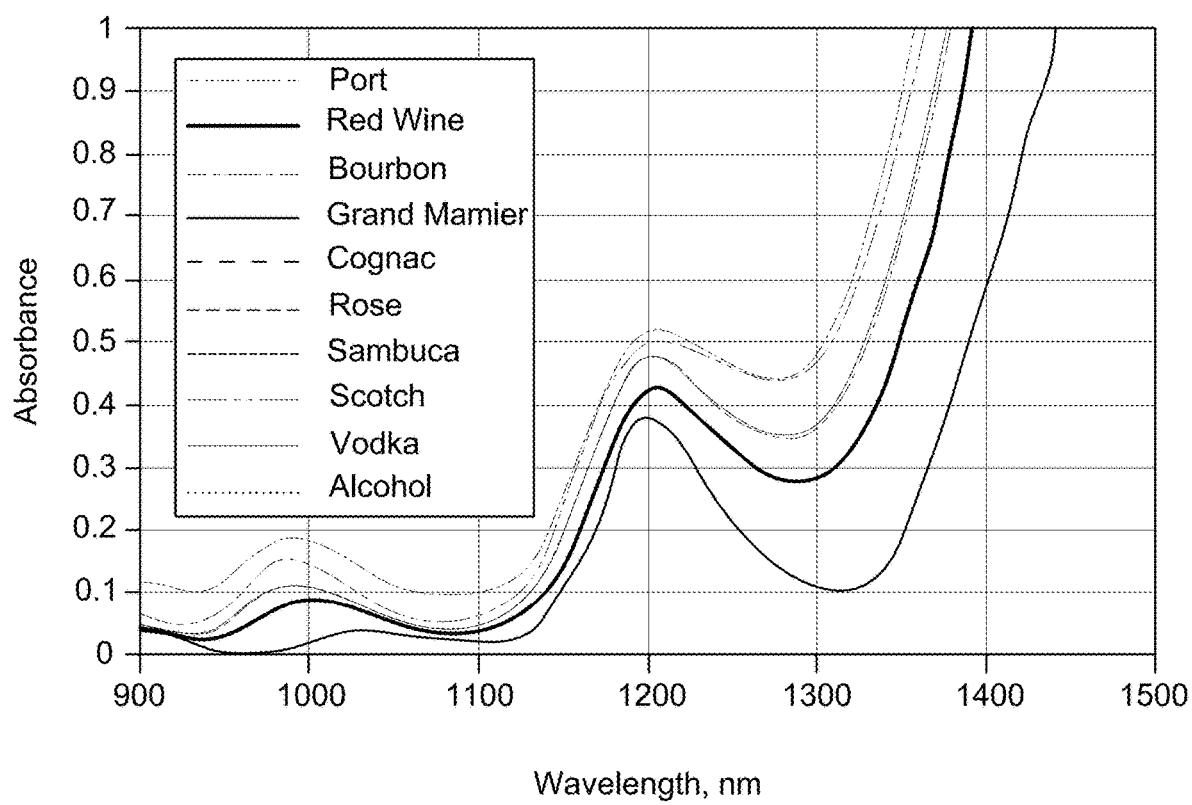
FIG. 12D is NIR spectral data for ethanol applications, such as wine and spirits.

FIGS. 10-12 present the spectral data from important non-automotive applications of the spectral sensing systems for commercial applications that include chemical production for important organic liquids and solvents (FIG. 10), plastics and polymers in FIG. 11 and alcohol production FIGS. 12A-D, which are an important industrial manufacturing process. The spectral sensor presented can easily be implemented for common manufacturing process, similar to those indicated by the spectral data, and at a cost of a few hundred dollars compared to multiple thousands of dollars for conventional sensors and instrumentation. An exemplary, important area of application for plastics where rapid, low cost differentiation is required is for waste disposal and for recycling. There are multiple areas of application for this class of spectral measurement.

Figure 13A:
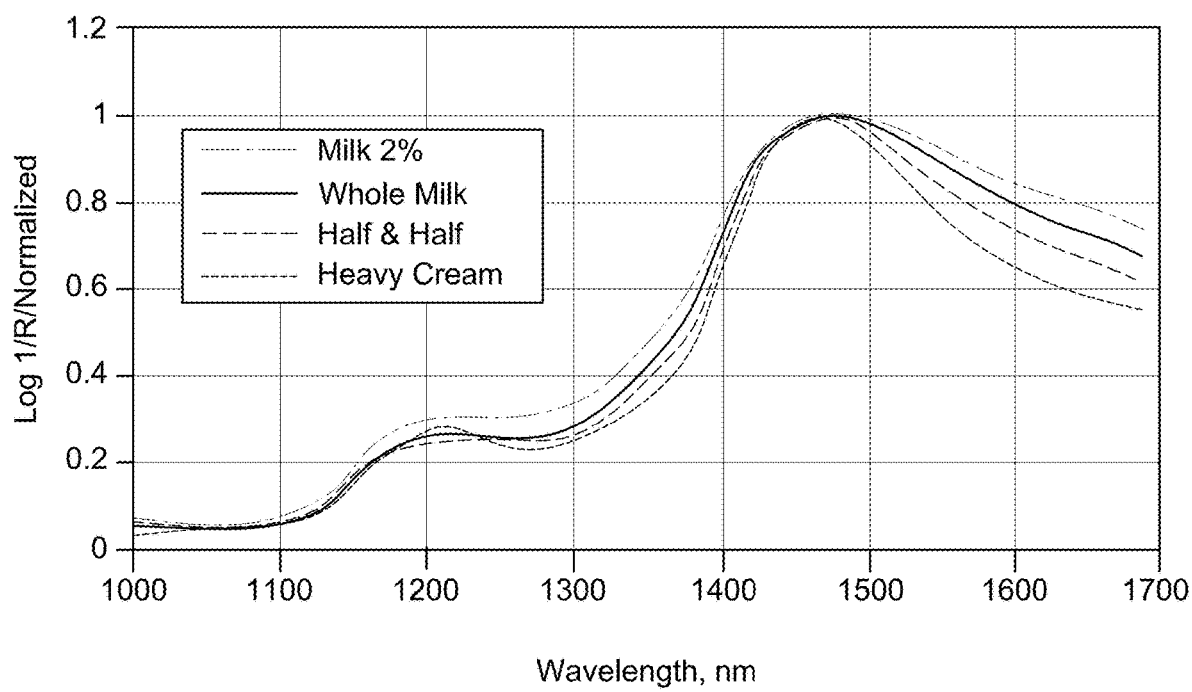
FIG. 13A is NIR spectral data for non-automotive; example applications such as dairy.
Figure 13B:
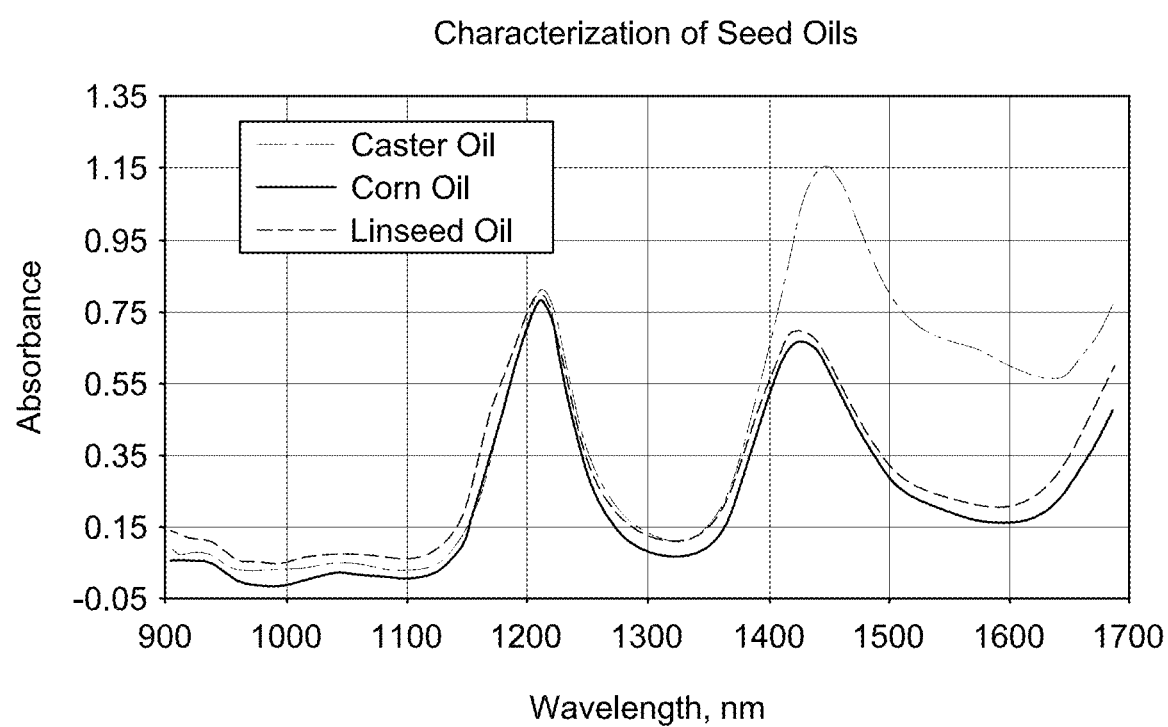
FIG. 13B is NIR spectral data for non-automotive; example applications such as seed oils.
Figure 14:
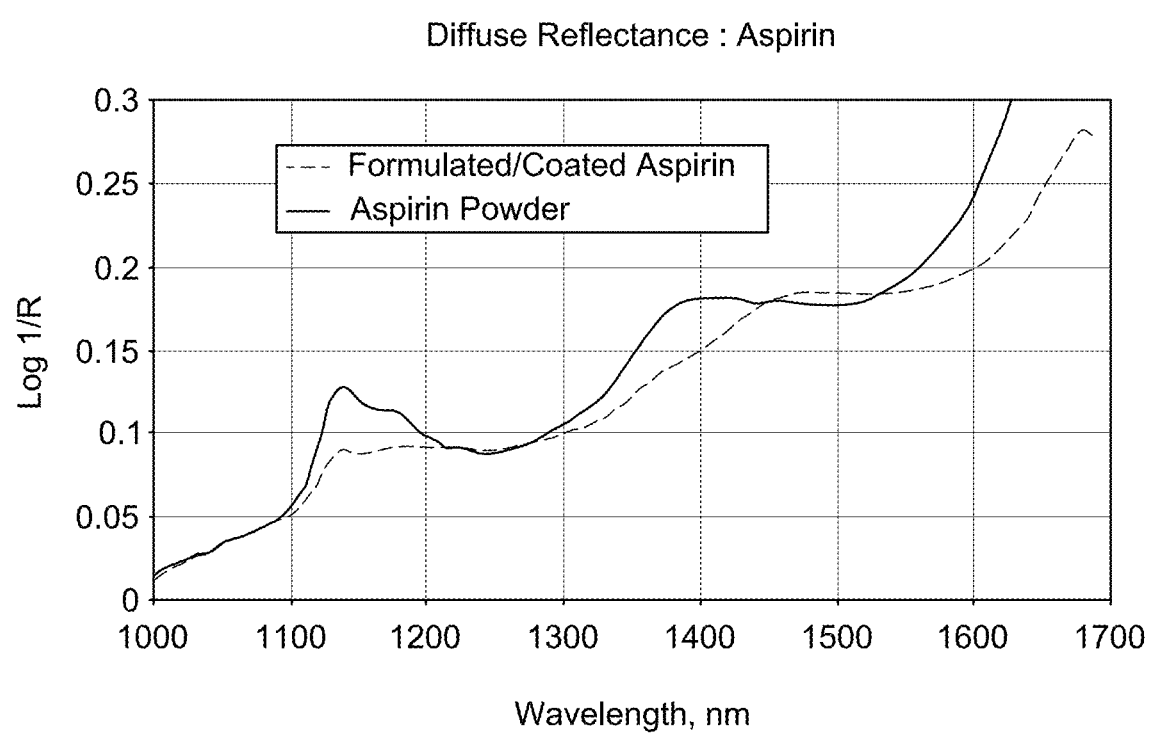
FIG. 14 in NIR spectral data for non-automotive; applications such as the pharmaceutical industry.

These are typical analyses that lend themselves to measurements by simple spectral sensors. Because of the benefits associated with multiple wavelength measurement capability, and the low cost implementations, the sensor technology can be considered for applications outside of the scope of normal automotive and industrial sensing. Three such areas of applications are indicated in FIGS. 13A-B and 14.

Dairy products are a classical adaptation of spectral analysis where milk quality, from the farm to the home, is monitored and measured by spectral methods. The availability of simple spectral sensors for milk production is an important advancement where there is the potential to determine milk quality at the dairy farm by literally placing sensors within the milking machine. Vegetable and seed oils are important classes of materials that can be measured and differentiated by spectral methods. Applications include quality assessment in food-grade liquids, such as extra virgin olive oil where a premium can be paid for the highest quality product and the detection of counterfeits where lower grade oils are substituted for higher quality grades. Another area the sensor can be used for is in characterization of drugs and pharmaceutical compounds. Providing the home with a low cost tool for characterizing drug products is one of many future applications for low cost spectral sensing.

What is claimed is:

1. A remote sampling sensor for determining characteristics of a sample, comprising:
    measurement optics, the measurement optics comprising:
        a light emitter;
        a light guide receiving light from said light emitter;
        a detector system; and
        integrated electronics; and
    an insertion probe, the insertion probe comprising:
        a chamber, the chamber being configured to permit the sample to enter said chamber;
        a retro-reflective optic, the retro-reflective optic being configured to return the light from said light emitter through the chamber to said detector system; and
        an insertion tip at a distal end of the insertion probe, the retro-reflective optic being adjacent the insertion tip,
    wherein the insertion probe is remotely located from the measurement optics.

2. The remote sampling sensor of claim 1, wherein the insertion tip is disposable and is replaceable with another disposable insertion tip to permit measurement of fluid without contamination from a previous measurement.

3. The remote sampling sensor of claim 1, configured for sensing properties of milk.

4. The remote sampling sensor of claim 1, configured for sensing a fat content of milk.

5. The remote sampling sensor of claim 1, configured for sensing properties of dairy products.

6. The remote sampling sensor of claim 1, configured for sensing properties of oils.

7. The remote sampling sensor of claim 1, configured for sensing properties of one of seed oils and vegetable oils.

8. The remote sampling sensor of claim 1, configured for sensing properties of olive oil.

9. The remote sampling sensor of claim 1, configured for sensing properties of alcohol.

10. The remote sampling sensor of claim 1, configured for sensing properties of drugs.

11. The remote sampling sensor of claim 1, wherein said chamber is an adjustable measurement chamber.

12. The remote sampling sensor of claim 1, wherein said light guide is solid.

13. The remote sampling sensor of claim 1, wherein said light guide comprises a hollow conduit.

14. The remote sampling sensor of claim 1, comprising a fiber optic cable configured to return said light to the detector system.

15. The remote sampling sensor of claim 1, wherein said detector system comprises at least one detector element having an optical filter configured to detect a pre-determined wavelength intensity of radiation transmitted through the sample by said light source.

16. The remote sampling sensor of claim 1, wherein said light emitter is a broadband light source.

17. The remote sampling sensor of claim 1, wherein said detector system is configured to have multi-wavelength detection.

18. The remote sampling sensor of claim 1, wherein said light emitter emits a wavelength between about 10 nm and about 26000 nm.

19. The remote sampling sensor of claim 1, further comprising a coupling apparatus configured to couple the light from the light emitter and the detector system to said chamber.

20. The remote sampling sensor of claim 1, wherein said detector system has a plurality of detector elements, each element having a unique optical filter configured to detect a unique wavelength intensity of radiation transmitted through the sample by said light source.

21. A remote sampling sensor for determining characteristics of a sample, comprising:
   measurement optics, the measurement optics comprising:
      a light emitter;
      a light guide receiving light from the light emitter;
      a detector system; and
      integrated electronics,
      wherein the measurement optics are remote and isolated from the sample; and
   an insertion probe, the insertion probe being remote from and operably coupled to the measurement optics, the insertion probe comprising:
      an insertion tip at a distal end of the insertion probe;
      a retro-reflective optic, the retro-reflective optic being proximal of the insertion tip and being configured to return the light from the light emitter to the detector system; and
      a chamber, the chamber being proximal of the retro-reflective optic and being configured to permit the sample to passively move through the chamber.

* * * * *